US012103564B2

(12) United States Patent
McAllister et al.

(10) Patent No.: US 12,103,564 B2
(45) Date of Patent: Oct. 1, 2024

(54) PLANNING-AWARE PREDICTION FOR CONTROL-AWARE AUTONOMOUS DRIVING MODULES

(71) Applicants: TOYOTA RESEARCH INSTITUTE, INC., Los Altos, CA (US); THE REGENTS OF THE UNIVERSITY OF CALIFORNIA, Oakland, CA (US)

(72) Inventors: Rowan Thomas McAllister, Berkeley, CA (US); Blake Warren Wulfe, San Francisco, CA (US); Jean Mercat, Mountain View, CA (US); Logan Michael Ellis, San Jose, CA (US); Sergey Levine, Berkeley, CA (US); Adrien David Gaidon, San Jose, CA (US)

(73) Assignees: TOYOTA RESEARCH INSTITUTE, INC., Los Altos, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 371 days.

(21) Appl. No.: 17/570,168

(22) Filed: Jan. 6, 2022

(65) Prior Publication Data
US 2023/0001953 A1    Jan. 5, 2023

Related U.S. Application Data

(60) Provisional application No. 63/250,957, filed on Sep. 30, 2021, provisional application No. 63/212,032, filed on Jun. 17, 2021.

(51) Int. Cl.
*B60W 10/04*    (2006.01)
*B60W 10/18*    (2012.01)
(Continued)

(52) U.S. Cl.
CPC ........ *B60W 60/0027* (2020.02); *B60W 10/04* (2013.01); *B60W 10/18* (2013.01);
(Continued)

(58) Field of Classification Search
CPC .. B60W 60/0027; B60W 10/04; B60W 10/18; B60W 10/20; B60W 50/0098;
(Continued)

(56) References Cited

U.S. PATENT DOCUMENTS

2020/0234066 A1*   7/2020  Lee ...................... G05D 1/0251
2020/0331465 A1*  10/2020  Herman ................. G08G 1/161
(Continued)

OTHER PUBLICATIONS

Abachi, et al., "Policy-aware model learning for policy gradient methods", arXiv:2003.00030, 2020.
(Continued)

*Primary Examiner* — Adam D Tissot
*Assistant Examiner* — Jean W Charleston
(74) *Attorney, Agent, or Firm* — SEYFARTH SHAW LLP

(57) ABSTRACT

A method of generating an output trajectory of an ego vehicle includes recording trajectory data of the ego vehicle and pedestrian agents from a scene of a training environment of the ego vehicle. The method includes identifying at least one pedestrian agent from the pedestrian agents within the scene of the training environment of the ego vehicle causing a prediction-discrepancy by the ego vehicle greater than the pedestrian agents within the scene. The method includes updating parameters of a motion prediction model of the ego vehicle based on a magnitude of the prediction-discrepancy caused by the at least one pedestrian agent on the ego vehicle to form a trained, control-aware prediction objective model. The method includes selecting a vehicle control action of the ego vehicle in response to a predicted motion from the trained, control-aware prediction objective model regarding
(Continued)

detected pedestrian agents within a traffic environment of the ego vehicle.

18 Claims, 9 Drawing Sheets

(51) Int. Cl.
| | |
|---|---|
| *B60W 10/20* | (2006.01) |
| *B60W 50/00* | (2006.01) |
| *B60W 60/00* | (2020.01) |
| *G05B 13/02* | (2006.01) |
| *G05B 13/04* | (2006.01) |

(52) U.S. Cl.
CPC ........ *B60W 10/20* (2013.01); *B60W 50/0098* (2013.01); *G05B 13/0265* (2013.01); *G05B 13/048* (2013.01); *B60W 2050/0022* (2013.01); *B60W 2050/0028* (2013.01); *B60W 2554/4029* (2020.02); *B60W 2710/18* (2013.01); *B60W 2710/20* (2013.01)

(58) Field of Classification Search
CPC . B60W 2050/0022; B60W 2050/0028; B60W 2554/4029; B60W 2710/18; B60W 2710/20; G05B 13/0265; G05B 13/048
USPC .......................................................... 701/25
See application file for complete search history.

(56) References Cited

U.S. PATENT DOCUMENTS

| | | | | |
|---|---|---|---|---|
| 2020/0361456 | A1* | 11/2020 | Stimpson | B60W 30/0956 |
| 2021/0031758 | A1* | 2/2021 | Urano | B60W 30/0953 |
| 2021/0139026 | A1* | 5/2021 | Phan | G08G 1/0968 |
| 2021/0347383 | A1* | 11/2021 | Siebert | G01C 21/3407 |
| 2022/0171065 | A1* | 6/2022 | Li | B60W 60/0027 |
| 2022/0266822 | A1* | 8/2022 | Nardi | B60W 60/001 |
| 2022/0340172 | A1* | 10/2022 | Pendleton | B60W 30/085 |

OTHER PUBLICATIONS

Ayoub, et al., "Model-based reinforcement learning with value-targeted regression", In International Conference on Machine Learning, pp. 463-474. PMLR, 2020.
Bansal, et al., "Goal-driven dynamics learning via bayesian optimization", Conference on Decision and Control (CDC), pp. 5168-5173. IEEE, 2017.
David Barber, "Bayesian reasoning and machine learning", Cambridge University Press, 2012.
Chang, et al., "Argoverse: 3D tracking and forecasting with rich maps", Proceedings of the IEEE/CVF Conference on Computer Vision and Pattern Recognition, pp. 8748-8757, 2019.
Cobb, et al., "Loss-calibrated approximate inference in Bayesian neural networks", arXiv preprint arXiv:1805.03901, 2018.
Deisenroth, et al., "PILCO: A model based and data-efficient approach to policy search", International Conference on machine learning (ICML), pp. 465-472. Citeseer, 2011.
Donti, et al., "Task-based end-to-end model learning in stochastic optimization", Neural Information Processing Systems (NeurIPS), vol. 30, pp. 5490-5500, 2017.
Dosovitskiy, et al., "CARLA: An open urban driving simulator", Conference on robot learning, pp. 1-16. PMLR, 2017.
Ettinger, et al., "Large scale interactive motion forecasting for autonomous driving: The waymo open motion dataset", arXiv preprint arXiv:2104.10133, 2021.
Farahmand, et al., "Value-aware loss function for model-based reinforcement learning", Artificial Intelligence and Statistics, pp. 1486-1494. PMLR, 2017.

Houston, et al., One thousand and one hours: Self-driving motion prediction dataset:, arXivpreprint arXiv:2006.14480, 2020.
Ivanovic, et al., "Rethinking trajectory forecasting evaluation", arXiv preprint arXiv:2107.10297, 2021.
Joseph, et al., "Reinforcement learning with misspecified model classes", International Conference on Robotics and Automation (ICRA), pp. 939-946. IEEE, 2013.
Kusmierczyk, et al., "Variational Bayesian decision-making for continuous utilities", arXiv preprint arXiv:1902.00792, 2019.
Lacoste-Julien, et al . . . "Approximate inference for the loss-calibrated Bayesian", Proceedings of the Fourteenth International Conference on Artificial Intelligence and Statistics, pp. 416-424. JMLR Workshop and Conference Proceedings, 2011.
Lambert, et al., "Objective mismatch in model-based reinforcement learning", arXiv preprint arXiv:2002.04523, 2020.
Leurent, et al., "Social attention for autonomous decision-making in dense traffic", arXiv preprint arXiv:1911.12250, 2019.
McAllister, et al., "Concrete problems for autonomous vehicle safety: advantages of Bayesian deep learning", International Joint Conferences on Artificial Intelligence, 2017.
Mercat, et al., "Multi-head attention for multi-modal joint vehicle motion forecasting",.2020 IEEE International Conference on Robotics and Automation (ICRA), pp. 9638-9644. IEEE, 2020.
Moerland, et al., "Model-based reinforcement learning: A survey", arXiv preprint arXiv:2006.16712, 2020.
Nagabandi, et al., "Learning image-conditioned dynamics models for control of underactuated legged millirobots", 2018 IEEE/RSJ International Conference on Intelligent Robots and Systems (IROS), pp. 4606-4613, IEEE, 2018.
Nair, et al., "Goalaware prediction: Learning to model what matters", International Conference on Machine Learning, pp. 7207-7219. PMLR, 2020.
NHTSA. PE 16-007. Technical report, United States Department of Transportation, National Highway Traffic Safety Administration, 2017.
NTSB. Preliminary report highway: HWY18MH010. Technical report, United States National Transportation Safety Board, 2019.
Philion, et al., "Learning to evaluate perception models using planner-centric metrics", Proceedings of the IEEE/CVF Conference on Computer Vision and Pattern Recognition, pp. 14055-14064, 2020.
Piazzoni, et al., "Modeling sensing and perception errors towards robust decision making in autonomous vehicles", arXiv preprint arXiv:2001.11695, 2020.
Reddy, et al., "Pragmatic image compression for human-in-the-loop decision-making", arXiv preprint rXiv:2108.04219, 2021.
Rhinehart, et al., R2P2: A reparameterized pushforward policy for diverse, precise generative path forecasting. In European Conference on Computer Vision. Springer, 2018.
Schwarting, et al., "Planning and decision-making for autonomous vehicles", Annual Review of Control, Robotics, and Autonomous Systems, 1:187-210, 2018.
Shridhar, et al., "Beelines: Evaluating motion prediction impact on self-driving safety and comfort", arXiv preprint arXiv:2011.00393, 2020.
Weng, et al., All-in-one drive: A comprehensive perception dataset with high-density long-range point clouds. 2021.
Wu, et al., "Understanding and improving information transfer in multitask learning", In ICLR, 2020.
Zeng, et al., End-to-end interpretable neural motion planner. In CVPR, 2019.
Cui, et al., "LookOut: Diverse Multi-Future Prediction and Planning for Self-Driving", International Conference on Computer Vision (ICCV), 2021.
Guo, et al., "The efficacy of Neural Planning Metrics: A meta-analysis of PKL on nuScenes", arXiv preprint arXiv:2010.09350, 2020.

\* cited by examiner

performance. While no model is perfect, a model that considers how errors propagate downstream to identify errors likely having significant real-life costs is desired for mitigating these significant errors and improving overall AV performance.

PLANNING-AWARE PREDICTION FOR CONTROL-AWARE AUTONOMOUS DRIVING MODULES

CROSS-REFERENCE TO RELATED APPLICATION

The present application claims the benefit of U.S. Provisional Patent Application No. 63/250,957, filed Sep. 30, 2021, and titled "CONTROL-AWARE PREDICTION OBJECTIVES FOR AUTONOMOUS DRIVING," and U.S. Provisional Patent Application No. 63/212,032, filed Jun. 17, 2021, and titled "BACKPROPAGATION OF CONCERNS: CONTROL-AWARE METRICS FOR AUTONOMOUS DRIVING MODULES," the disclosures of which are expressly incorporated by reference herein in their entireties.

BACKGROUND

Field

Certain aspects of the present disclosure generally relate to autonomous vehicle technology and, more particularly, to a prediction metric that improves the accuracy of learned motion-prediction models for autonomous vehicles.

Background

Autonomous agents rely on machine vision for sensing a surrounding environment by analyzing areas of interest in a scene from images of the surrounding environment. Although scientists spent decades studying the human visual system, a solution for realizing equivalent machine vision remains elusive, but is a goal for enabling truly autonomous agents. Machine vision, however, is distinct from the field of digital image processing. In particular, machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, quickly evolved and are a reality in this decade. Because autonomous agents interact with humans, however, many critical concerns arise. For example, one critical concern is how to design vehicle control of an autonomous vehicle using machine learning. Unfortunately, vehicle control by machine learning is less effective in complicated traffic environments involving complex interactions between vehicles (e.g., in situations where an ego vehicle maneuvers through roadway traffic and intersections).

Human drivers navigate busy roads by carefully observing, anticipating, and reacting to the potential actions of other pedestrians and/or vehicles. Similarly, autonomous vehicles (AVs) use learned perceptual and predictive components for detecting and forecasting surrounding road users to plan safe motions. In particular, safe operation involves learned components that are well trained, for example, by reducing certain classification or regression errors on training data. Nevertheless, not all errors are equally important: some errors have a minimal effect on downstream decisions, while other errors may be catastrophic. For example, errors in detecting vehicles and forecasting pedestrians have resulted in fatal collisions, while errors associated with those unlikely to interact with an autonomous vehicle (AV) are likely inconsequential and uncorrelated with overall vehicle

SUMMARY

A method of generating an output trajectory of an ego vehicle includes recording trajectory data of the ego vehicle and pedestrian agents from a scene of a training environment of the ego vehicle. The method includes identifying at least one pedestrian agent from the pedestrian agents within the scene of the training environment of the ego vehicle causing a prediction-discrepancy by the ego vehicle greater than the pedestrian agents within the scene. The method includes updating parameters of a motion prediction model of the ego vehicle based on a magnitude of the prediction-discrepancy caused by the at least one pedestrian agent on the ego vehicle to form a trained, control-aware prediction objective model. The method includes selecting a vehicle control action of the ego vehicle in response to a predicted motion from the trained, control-aware prediction objective model regarding detected pedestrian agents within a traffic environment of the ego vehicle.

A non-transitory computer-readable medium having program code recorded thereon for generating an output trajectory of an ego vehicle is described. The program code is executed by a processor. The non-transitory computer-readable medium includes program code to record trajectory data of the ego vehicle and pedestrian agents from a scene of a training environment of the ego vehicle. The non-transitory computer-readable medium also includes program code to identify at least one pedestrian agent from the pedestrian agents within the scene of the training environment of the ego vehicle causing a prediction-discrepancy by the ego vehicle greater than the pedestrian agents within the scene. The non-transitory computer-readable medium further includes program code to update parameters of a motion prediction model of the ego vehicle based on a magnitude of the prediction-discrepancy caused by the at least one pedestrian agent on the ego vehicle to form a trained, control-aware prediction objective model. The non-transitory computer-readable medium also includes program code to select a vehicle control action of the ego vehicle in response to a predicted motion from the trained, control-aware prediction objective model regarding detected pedestrian agents within a traffic environment of the ego vehicle.

A system for generating an output trajectory of an ego vehicle is described. The system includes a vehicle perception module to record trajectory data of the ego vehicle and pedestrian agents from a scene of a training environment of the ego vehicle. The system also includes a control-aware prediction objective model to identify at least one pedestrian agent from the pedestrian agents within the scene of the training environment of the ego vehicle causing a prediction-discrepancy by the ego vehicle greater than the pedestrian agents within the scene. The system further includes a model parameter update module to update parameters of a motion prediction model of the ego vehicle based on a magnitude of the prediction-discrepancy caused by the at least one pedestrian agent on the ego vehicle to form a trained, control-aware prediction objective model. The system also includes a vehicle action selection module to select a vehicle control action of the ego vehicle in response to a predicted motion from the trained, control-aware prediction objective model regarding detected pedestrian agents within a traffic environment of the ego vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
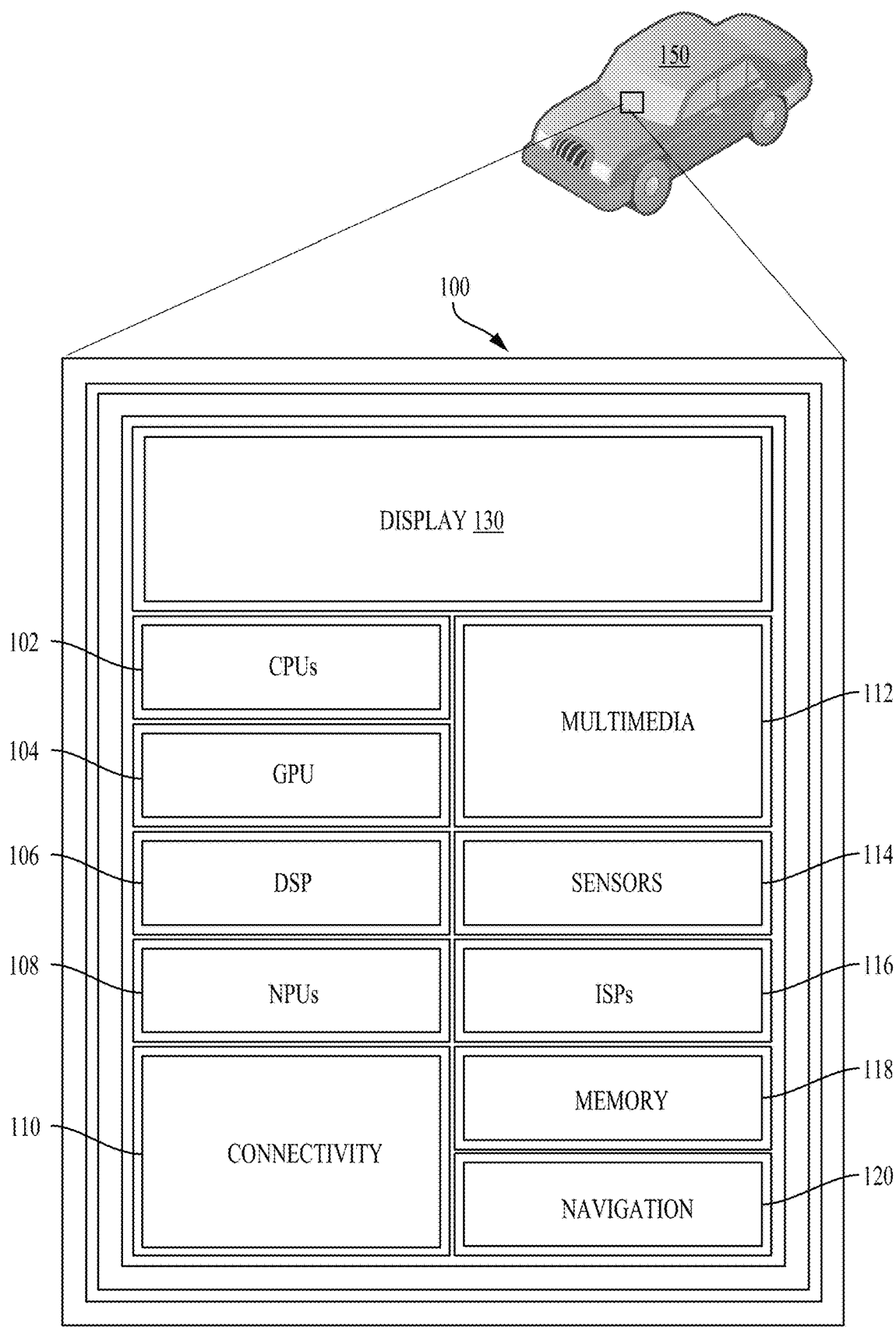
FIG. 1 illustrates an example implementation of designing a neural network using a system-on-a-chip (SOC) for control-aware motion prediction in an autonomous vehicle planner system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Autonomous agents, such as driverless cars and robots, quickly evolved and are a reality in this decade. Because autonomous agents interact with humans, however, many critical concerns arise. For example, one critical concern is how to design vehicle control of an autonomous vehicle using machine learning. Unfortunately, vehicle control by machine learning is less effective in complicated traffic environments involving complex interactions between vehicles. For example, an ego vehicle may rely on a planner to safely maneuver through complex traffic environments and traffic intersections.

Human drivers navigate busy roads by carefully observing, anticipating, and reacting to the potential actions of other pedestrians and/or vehicles. Similarly, autonomous vehicles (AVs) use learned perceptual and predictive components for detecting and forecasting surrounding road users to plan safe motions. In particular, safe autonomous vehicle operation involves learned components that are well trained, for example, by reducing certain classification or regression errors on training data; however, all errors are not equally important. For example, some errors have a minimal effect on downstream decisions, while other errors may be catastrophic. In fact, errors in detecting vehicles and forecasting pedestrians have resulted in fatal collisions, while errors associated with those unlikely to interact with an autonomous vehicle (AV) are likely inconsequential and uncorrelated with overall vehicle performance. While no model is perfect, a model that considers how errors propagate downstream to identify errors likely having a significant real-life cost is desired for mitigating these significant errors and improving overall AV performance.

Whether trained independently or as part of multi-task end-to-end architectures, multi-agent trajectory forecasting models typically optimize prediction-specific objectives based on regressing recorded future trajectories by considering all agents equally important a priori. Nevertheless, when considering the target control task of autonomous navigation, some predictions warrant more attention than others when deciding safety controls. Consequently, control-agnostic optimizing of prediction models may not result in improved downstream navigation performance due to limited data, model capacity, rare events, or computational constraints. Even with end-to-end training, multi-task objectives might not be aligned, thus resulting in performance degradation due to task interference.

Aspects of the present disclosure are directed to control-aware prediction objectives (CAPOs) to train prediction models that more accurately reflect the relative effects of predictive errors on downstream control. Computing these downstream effects involves forward passes without backpropagation between modules. This improves applicability with real-world AV planning and control systems, which might not be fully differentiable due to complex design constraints (e.g., verifiability, interpretability, comfort and safety constraints). Our method introduces importance-weighted prediction likelihood objectives using forward passes of the prediction model and planner. In aspects of the present disclosure, two weighting methods that can be trained with backpropagation. The first assigns weights based on control variations due to prediction changes. The second uses learned attention weights between agent predictions and AV controls.

Some aspects of the present disclosure involve training prediction models with control-aware objectives that lead to improved controller performance in complex multi-agent urban driving scenarios. By evaluating existing prediction models based on these control-aware metrics, the models according to aspects of the present disclosure are more likely to avoid precisely those errors that would maximally influence downstream decisions. In particular, some aspects of the present disclosure directly identify those errors that would maximally influence downstream decisions, including prediction algorithms that treat everything equally.

FIG. 1 illustrates an example implementation of a control-aware prediction objective module for a vehicle action planner using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a temporal component of a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include program code to determine one or more merge gaps between vehicles in a target lane of a multilane highway based on images processed by the sensor processor 114. The instructions loaded into a processor (e.g., CPU 102) may also include program code executed by the processor.

In aspects of the present disclosure, the instructions include program code to record trajectory data of an ego vehicle and agents from a scene of a training environment of the ego vehicle. The instructions also include program code to identify at least one agent from the agents within the scene of the training environment of the ego vehicle causing a prediction-discrepancy by the ego vehicle greater than the agents within the scene of the training environment. The instructions also include program code to update parameters of a motion prediction model of the ego vehicle based on a magnitude of the prediction-discrepancy caused by the at least one agent on the ego vehicle to form a trained, control-aware prediction module. The instructions also include program code to select a vehicle control action of the ego vehicle in response to a predicted motion from the trained, control-aware prediction module regarding detected agents within a traffic environment of the ego vehicle. These aspects of the present disclosure optimize a likelihood of known actions to direct a control-aware motion prediction model's attention towards accurately predicting a subset of states that help to predict the ego vehicle control decisions well.

Figure 2:
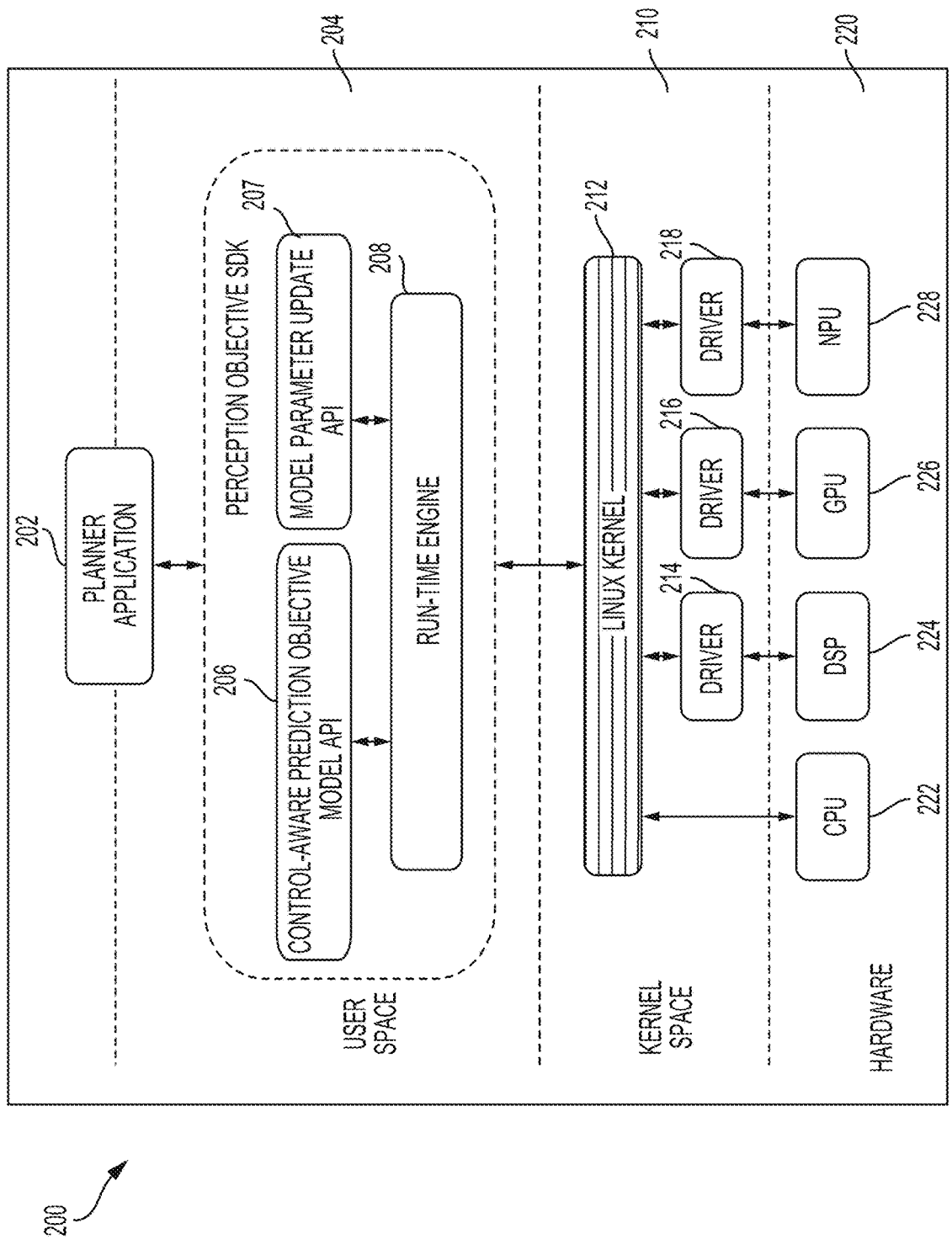
FIG. 2 is a block diagram illustrating a software architecture that may modularize artificial intelligence (AI) functions for control-aware motion prediction in an action planner system of an autonomous agent, according to aspects of the present disclosure.

FIG. 2 is a block diagram illustrating a software architecture 200 that may modularize artificial intelligence (AI) functions for learning control-aware prediction objective models, according to aspects of the present disclosure. Using the architecture, a planner application 202 may be designed such that it may cause various processing blocks of a system-on-a-chip (SOC) 220 (for example a CPU 222, a DSP 224, a GPU 226, and/or an NPU 228) to perform supporting computations during run-time operation of the planner application 202. While FIG. 2 describes the software architecture 200 for planning-aware prediction to select vehicle control actions of an autonomous agent in response to control-aware prediction objective models, it should be recognized that vehicle action control functionality is not limited to autonomous agents. According to aspects of the present disclosure, vehicle action planning functionality is applicable to any vehicle type, provided the vehicle is equipped with appropriate machine learning functions.

The planner application 202 may be configured to call functions defined in a user space 204 that may, for example, provide vehicle action planning services (e.g., throttling, steering, and braking). The planner application 202 may request to compile program code associated with a library defined in a control-aware prediction objective model application programming interface (API) 206. In these aspects of the present disclosure, the control-aware prediction objective model API 206 predicts a future motion of a detected agent within a training environment of an ego vehicle. Alternatively, the control-aware prediction objective model API 206 predicts a future action of the ego vehicle. For example, a perception model detects the agent from an image of the training environment of the ego vehicle.

Nevertheless, certain detections and predictions matter more than others from the perspective of the ego vehicle. For example, one way to determine a prediction relevancy to an ego vehicle is whether the prediction influences the ego vehicle's motion planning. Alternatively, the prediction relevancy to the ego vehicle is whether the prediction influences the ego vehicle's motion prediction. In some aspects of the present disclosure, at least one agent from the agents within the scene of the training environment of the ego vehicle is identified if the agent caused a prediction-discrepancy by the ego vehicle greater than the agents within the scene of the training environment. In other words, that which an autonomous vehicle's controller is sensitive to is more important to predict accurately.

The planner application 202 may request to compile program code associated with a library defined in a model parameter update API 207. In these aspects of the present disclosure, the model parameter update API 207 updates parameters of a motion prediction model based on a magnitude of a prediction-discrepancy caused by at least one agent on the ego vehicle to form a trained, control-aware prediction module. For example, the prediction-discrepancy may be based on a difference between a predicted vehicle action based on a future motion predicted for the at least one agent and an expected action of the training environment to form the trained, control-aware prediction model. Alternatively, the control-aware prediction model learns correlations between the planner's trajectories and the agents' trajectories, in which larger attention coefficients are given to the agents that cause larger reactions from the ego vehicle controller based on the prediction-discrepancy. Once trained, the planner application 202 selects a vehicle control action of the ego vehicle in response to a predicted motion from the trained, control-aware prediction module regarding detected agents within a traffic environment of the ego vehicle.

A run-time engine 208, which may be compiled code of a runtime framework, may be further accessible to the planner application 202. The planner application 202 may cause the run-time engine 208, for example, to take actions for controlling the autonomous agent. When an ego vehicle enters a traffic environment, the run-time engine 208 may in turn send a signal to an operating system 210, such as a Linux Kernel 212, running on the SOC 220. FIG. 2 illustrates the Linux Kernel 212 as software architecture for implementing trajectory planning of an autonomous agent using an automaton generative network. It should be recognized, however, aspects of the present disclosure are not limited to this exemplary software architecture. For example, other kernels may be used to provide the software architecture to support vehicle planning trajectory selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
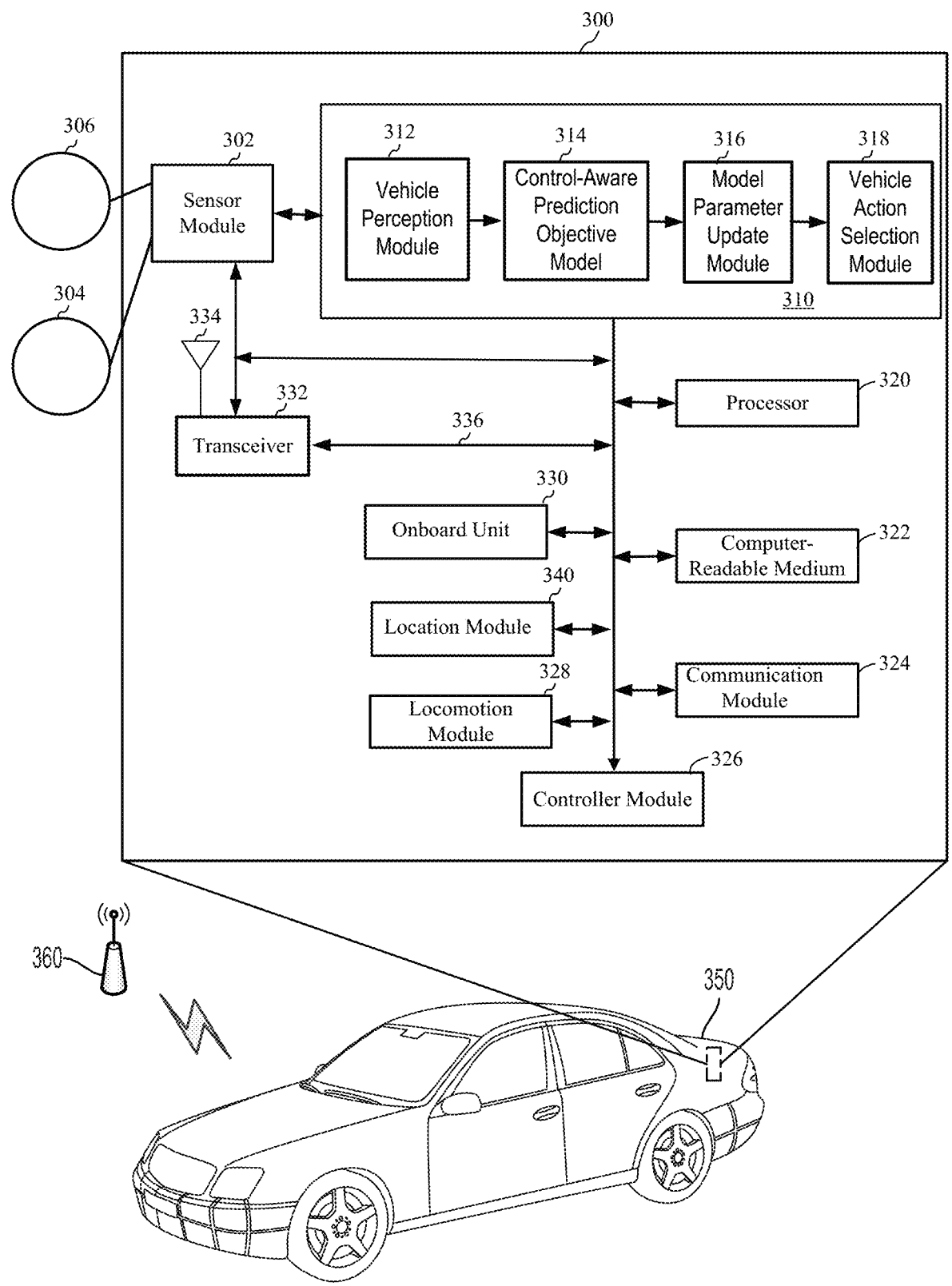
FIG. 3 is a diagram illustrating an example of a hardware implementation for a control-aware motion prediction objective in a vehicle action planner system, according to aspects of the present disclosure.

FIG. 3 is a diagram illustrating an example of a hardware implementation for a vehicle action planner system 300, according to aspects of the present disclosure. The vehicle action planner system 300 may be configured with a control-aware prediction objective model for a vehicle action planner of an ego vehicle. The vehicle action planner system 300 may be a component of a vehicle, a robotic device, or other autonomous device (e.g., autonomous vehicles, ride-share cars, etc.). For example, as shown in FIG. 3, the vehicle action planner system 300 is a component of an autonomous vehicle 350.

Aspects of the present disclosure are not limited to the vehicle action planner system 300 being a component of the autonomous vehicle 350. Other devices, such as a bus, motorcycle, or other like autonomous vehicle, are also contemplated for implementing the vehicle action planner system 300. In this example, the autonomous vehicle 350 may be semi-autonomous; however, other configurations for the autonomous vehicle 350 are contemplated, such as an advanced driver assistance system (ADAS).

The vehicle action planner system 300 may be implemented with an interconnected architecture, represented generally by an interconnect 336. The interconnect 336 may include any number of point-to-point interconnects, buses, and/or bridges depending on the specific application of the vehicle action planner system 300 and the overall design constraints. The interconnect 336 links together various circuits including one or more processors and/or hardware modules, represented by a sensor module 302, a vehicle action planner 310, a processor 320, a computer-readable medium 322, a communication module 324, a controller module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle action planner system 300 includes a transceiver 332 coupled to the sensor module 302, the vehicle action planner 310, the processor 320, the computer-readable medium 322, the communication module 324, the controller module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit vehicle-to-vehicle traffic state information for the vehicle action planner 310 to/from connected vehicles within the vicinity of the autonomous vehicle 350.

The vehicle action planner system 300 includes the processor 320 coupled to the computer-readable medium 322.

The processor 320 performs processing, including the execution of software stored on the computer-readable medium 322 to provide vehicle action planning functionality, according to the present disclosure. The software, when executed by the processor 320, causes the vehicle action planner system 300 to perform the various functions described for vehicle behavior planning (e.g., vehicle action selection) of the autonomous vehicle 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle action planner 310, the communication module 324, the controller module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the autonomous vehicle 350 or may be in communication with the autonomous vehicle 350.

The location module 340 may determine a location of the autonomous vehicle 350. For example, the location module 340 may use a global positioning system (GPS) to determine the location of the autonomous vehicle 350. The location module 340 may implement a dedicated short-range communication (DSRC)-compliant GPS unit. A DSRC-compliant GPS unit includes hardware and software to make the autonomous vehicle 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the autonomous vehicle 350 that are not modules of the vehicle action planner system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle action planner system 300 also includes the controller module 326 for planning a route and controlling the locomotion of the autonomous vehicle 350, via the locomotion module 328 for autonomous operation of the autonomous vehicle 350. In one configuration, the controller module 326 may override a user input when the user input is expected (e.g., predicted) to cause a collision according to an autonomous level of the autonomous vehicle 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the autonomous vehicle 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle action planner 310 may be in communication with the sensor module 302, the processor 320, the computer-readable medium 322, the communication module 324, the controller module 326, the locomotion module 328, the location module 340, the onboard unit 330, and the transceiver 332. In one configuration, the vehicle action planner 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle action planner 310 may receive sensor data directly from the first sensor 306 and the second sensor 304 to determine, for example, input traffic data images.

Human drivers navigate busy roads by carefully observing, anticipating, and reacting to the potential actions of other pedestrians and/or vehicles. Similarly, autonomous vehicles (AVs) such as the autonomous vehicle 350 use learned perceptual and predictive components for detecting and forecasting surrounding road users to plan safe motions. In particular, safe autonomous vehicle operation involves learned components that are well trained, for example, by reducing certain classification or regression errors on training data; however, all errors are not equally important. For example, some errors have a minimal effect on downstream decisions, while other errors may be catastrophic. In fact, errors in detecting vehicles and forecasting pedestrians have resulted in fatal collisions, while errors associated with those unlikely to interact with the autonomous vehicle 350 are likely inconsequential and uncorrelated with overall vehicle performance. While no model is perfect, a model that considers how errors propagate downstream to identify errors likely having a significant real-life cost is desired for mitigating these significant errors and improving overall AV performance of the autonomous vehicle 350.

As noted, certain detections and predictions matter more than others from the perspective of the autonomous vehicle 350. For example, one way to determine a prediction relevancy to an ego vehicle is whether the prediction influences the ego vehicle's motion planning. In other words, that which an autonomous vehicle's controller is sensitive to is more important to predict accurately. Some aspects of the present disclosure are directed to control-aware prediction objectives (CAPOs) to train prediction models that more accurately reflect the relative effects of predictive errors on downstream control. Computing these downstream effects involves forward passes without backpropagation between modules.

As indicated above, predictive models of conventional autonomous vehicles are typically trained using metrics that are independent to other components in the autonomous vehicle's system, such as the planner. In particular, the metrics are oblivious to how the predictions they make are eventually applied. By contrast, aspects of the present disclosure propose a novel prediction metric that is planning aware. Given a planning algorithm, aspects of the present disclosure seek to improve a predictive accuracy in areas in which the planner specifies accuracy. These aspects of the present disclosure train a predictive model to maximize the likelihood of the true actions of the autonomous vehicle 350 from a training set of prior autonomous driving data.

Aspects of the present disclosure optimize inputs (e.g., scene predictions) to a vehicle action planner 310 of the autonomous vehicle 350, such that outputs (e.g., vehicle actions) of the vehicle action planner 310 are accurate. Some aspects of the present disclosure involve training prediction models with control-aware objectives that lead to improved controller performance in complex multi-agent urban driving scenarios. By evaluating existing prediction models based on these control-aware metrics, the models according to aspects of the present disclosure are more likely to avoid precisely those errors that would maximally influence downstream decisions. In particular, some aspects of the present disclosure directly identify those errors that would maximally influence downstream decisions, including prediction algorithms that treat everything equally. For example, any predictions that do not affect planning do not receive a significant weight, which enables the prediction model to safely allocate model capacity elsewhere. Although the best prediction metric for a control-aware prediction is difficult to ascertain, some potential prediction metrics are proposed for the vehicle action planner 310, according to aspects of the present disclosure.

As shown in FIG. 3, the vehicle action planner 310 of the autonomous vehicle 350 includes a vehicle perception module 312, a control-aware prediction objective model 314, a model parameter update module 316, and a vehicle action selection module 318. The vehicle perception module 312, the control-aware prediction objective model 314, the model parameter update module 316, and the vehicle action selection module 318 may be components of a same or different artificial neural network, such as a deep convolutional neural network (CNN). The vehicle action planner 310 is not limited to a CNN. The vehicle action planner 310 receives a data stream from the first sensor 306 and/or the second sensor 304. The data stream may include a 2D RGB image from the first sensor 306 and LIDAR data points from the second sensor 304. The data stream may include multiple frames, such as image frames of traffic data.

The control-aware prediction objective model 314 may be configured to identify at least one agent from the agents within the scene of the training environment of the autonomous vehicle 350 causing a prediction-discrepancy by the autonomous vehicle 350 greater than the agents within the scene of the training environment. For example, the control-aware prediction objective model 314 may predict a future motion of agents detected by the vehicle perception module 312, as well as the autonomous vehicle 350 based on the predicted future motion of the agents within the scene. In these aspects of the present disclosure, the model parameter update module 316 is configured to update parameters of the control-aware prediction objective model 314 based on a magnitude of the prediction-discrepancy caused by the at least one agent on the ego vehicle to form a trained, control-aware prediction module.

For example, the model parameter update module 316 is configured to update parameters of control-aware prediction objective model 314 based on a difference between a predicted vehicle action based on a future motion predicted for a detected agent and an expected action of a training environment to train the control-aware prediction objective model 314. In addition, the vehicle action selection module 318 is configured to select a vehicle control action of the autonomous vehicle 350 in response to a predicted motion from the control-aware prediction objective model 314 regarding detected agents within a traffic environment of the autonomous vehicle 350. These aspects of the present disclosure optimize a likelihood of expert action to direct the control-aware prediction objective model 314 towards accurately predicting a subset of states that help to predict the decisions of the autonomous vehicle 350. A vehicle behavior of the autonomous vehicle 350 may be controlled by the vehicle action planner 310 in a manner for motion planning and maneuvering of the autonomous vehicle 350 to perform a driving maneuver, for example, as shown in FIG. 4.

Figure 4:
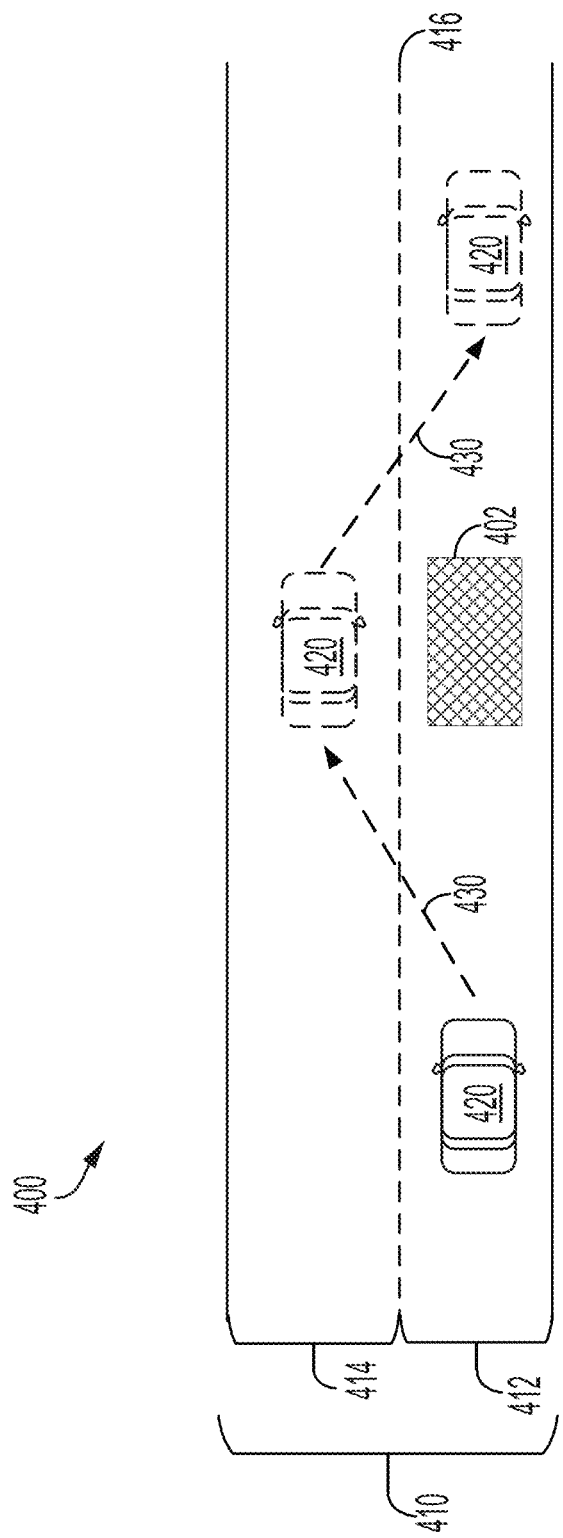
FIG. 4 is a diagram illustrating an overview of a roadway environment, including an ego vehicle having a data driven trajectory planner, according to aspects of the present disclosure.

FIG. 4 is a diagram illustrating an overview of a roadway environment, including an ego vehicle having a data-driven trajectory planner, according to aspects of the present disclosure. In this example, a roadway environment 400 includes a roadway 410, having a first lane 412 in which an ego vehicle 420 is traveling in a second lane 414. In addition, the first lane 412 also includes an obstruction 402. In this example, the ego vehicle 420 is configured to monitor the dynamics of both vehicles/obstructions in the first lane 412, as well as vehicles/obstructions in the second lane 414 of the roadway 410. In this example, the ego vehicle 420, may be the autonomous vehicle 350, shown in FIG. 3.

In one aspect of the present disclosure, maneuvering of the ego vehicle 420 is essentially controlled by a vehicle planner (e.g., the vehicle action planner 310 of FIG. 3). In this example, the ego vehicle 420 (e.g., the vehicle perception module 312 of FIG. 3) identifies the obstruction 402 in the first lane 412 of the roadway 410. That is, the ego vehicle 420 is configured to identify a driving trajectory for avoiding the obstruction 402 in the first lane 412 of the roadway 410. According to aspects of the present disclosure, the ego vehicle 420 is configured to identify a trajectory for a driving maneuver performed by the ego vehicle 420 to avoid the obstruction 402 in the first lane 412. In some aspects of the present disclosure, the ego vehicle 420 is deployed using a control-aware prediction objective model 314 of the vehicle action planner 310, as shown in FIG. 3.

In operation, autonomous vehicles (AVs) navigate busy roads using predictive models to anticipate what surrounding pedestrians and vehicles might do in order to plan safe trajectories around these agents. Safe operation involves well calibrated predictive model components, typically by minimizing some regression error on training data. Nevertheless, not all errors made by these prediction modules are equally important. In particular, some errors have minimal effect on downstream decisions, while some perceptual errors and predictive errors can have fatal outcomes. As no model is perfect, it is important to identify the prediction errors that are safety-critical in order to ensure autonomous vehicle operation safety.

Whether trained independently or as part of multi-task end-to-end architectures, multi-agent trajectory forecasting models typically optimize prediction-specific objectives based on regressing recorded future trajectories by considering all agents equally important a priori. Nevertheless, when considering the target control task of autonomous navigation, some predictions warrant more attention than others when deciding safety controls. Consequently, control-agnostic optimizing of prediction models may not result in improved downstream navigation performance due to limited data, model capacity, rare events, or computational constraints. Even with end-to-end training, multi-task objectives might not be aligned, thus resulting in performance degradation due to task interference.

Aspects of the present disclosure are directed to control-aware prediction objectives (CAPOs) to train prediction models that more accurately reflect the relative effects of predictive errors on downstream control. Computing these downstream effects involves forward passes without backpropagation between modules. This improves applicability with real-world AV planning and control systems, which might not be fully differentiable due to complex design constraints (e.g., verifiability, interpretability, comfort and safety constraints). A disclosed method introduces importance-weighted prediction likelihood objectives using forward passes of the prediction model and planner. In aspect of the present disclosure, two weighting methods are investigated for training using backpropagation. The first assigns weights based on control variations due to prediction changes. The second uses learned attention weights between agent predictions and AV controls.

Some aspects of the present disclosure involve training prediction models with control-aware objectives that lead to improved controller performance in complex multi-agent urban driving scenarios. By evaluating existing prediction models based on these control-aware metrics, the models according to aspects of the present disclosure are more likely to avoid precisely those errors that would maximally influence downstream decisions. In particular, some aspects of the present disclosure directly identify those errors that would maximally influence downstream decisions, including prediction algorithms that treat everything equally.

The following example formalizes notation and the task of scene prediction, according to aspects of the present disclosure. The following examples involve a multi-agent system of N agents (including an ego vehicle) that interact in a continuous space, discrete time setting. For example, Let x∈X denote past trajectory information about all agent's in a scene, used to make probabilistic predictions $\hat{y} \in \mathcal{P}_y$ about the future multi-agent trajectories y∈y. Trajectories are predicted up to time horizon T, and $y_T$ denotes the future state at time T As the intents of other agents are usually uncertain, a probabilistic prediction model $q_\theta$ with trainable parameters θ is used to sample the motion of others: $\hat{y} \sim q_\theta(\hat{y}|x)$. If multiple samples are taken, $\hat{y}^k$ refers to the kth sample, and to single out the nth agent is overload by using the notation $\hat{y}_n$, and use $y_{ego}$ as the AV's future trajectory. Given such predictions, the AV controller π outputs ego controls $u \in \mathcal{U}$ to anticipate and avoid colliding with other agents' future trajectories: u=π(y).

Aspects of the present disclosure are provided based on the assumption that an autonomous vehicle (AV) stack (e.g., perception, prediction, and planning) performs behavior prediction before control. While conditioning behavior prediction on an ego vehicle's intent to provide more accurate prediction, aspects of the present disclosure assume that other agents do not anticipate the autonomous vehicle's future trajectory. In these aspects of the present disclosure, the autonomous vehicle anticipates the other agents' future trajectories in order to avoid collisions. For example, because the latent intent of other drivers is usually uncertain, probabilistic models are selected to forecast the motion of others by training using the negative log likelihood (NLL) of past motion data, for example, as shown in Table I.

TABLE 1

Prediction Metrics

| Metric Name | Metric Equation |
|---|---|
| Average Displacement Error (ADE) | $\|\hat{y} - y\|_2$ |
| Final Displacement Error (FDE) | $\|\hat{y}_T - y_T\|_2$ |
| Minimum-ADE (minADE) | $\min_{k \in [K]} \|\hat{y}^k - y\|_2$ |
| Minimum-FDE (minFDE) | $\min_{k \in [K]} \|\hat{y}_T^k - y_T\|_2$ |
| Miss Rate (MR) Negative Log Likelihood (NLL): | $\frac{1}{K}\sum_k \mathbb{1}[\|\hat{y}_T^k - y_T\|_2 > \alpha] - \log q_\theta(y\|x)$ |

For example, a metric may compare the Euclidean distance between either a full predicted state-sequence $\hat{y}$ (or final state $\hat{y}_T$) with the true sequence y (or final state $y_T$) an agent took, as recorded in data. Probabilistic models are typically trained to minimize the negative log likelihood (NLL) of the data. These metrics, however, are agnostic to road geometry and downstream planning, which implicitly assumes that all other agents' forecasts are equally relevant. For example, consider two pedestrians: one walking ahead of the ego vehicle and one behind. Assuming independent pedestrian motion, the NLL objective factorizes as: $-\log_{q_\theta}(y^{ahead}, y^{behind}|x) = -\log_{q_\theta}(y^{ahead}|x) - \log_{q_\theta}(y^{behind}|x)$. It should be recognized that this prediction metric is equally concerned with both $y^{ahead}$ and $y^{behind}$. Intuitively, accurate prediction of the pedestrian ahead of the ego vehicle is more important for safe motion planning since the ego's planned path is more likely to intersect with $y^{ahead}$ than $y^{behind}$. Control-aware prediction objects are aware that errors in predicting $y^{ahead}$ have greater downstream consequences than errors in $y^{behind}$, according to aspects of the present disclosure.

Control-Aware Prediction Objectives

Predictive models are typically trained using metrics that are independent to everything else in the autonomous vehicle's system, such as the planner of the autonomous vehicle. In particular, the metrics are oblivious to how the predictions they make are used. Aspects of the present disclosure are directed to a novel prediction metric that is planning aware. Given a planning algorithm, aspects of the present disclosure improve predictive accuracy in areas in which the planner specifies accuracy. In some aspects of the present disclosure, a predictive model is trained to increase the likelihood of the ego's true actions from a training set of prior autonomous driving data. This involves improving the planner's inputs (e.g., scene predictions), such that the planner's outputs (e.g., ego actions) are accurate. Training in this way, with gradients passing through a fixed planning algorithm to improve various predictions, inherently weights those predictions that contribute to higher planning accuracy. In these aspects of the present disclosure, any predictions that do not affect planning are weighted less so the prediction model can safely allocate model capacity elsewhere.

Some aspects of the present disclosure are directed to a novel prediction loss function that considers how predictions are used downstream to improve predictive accuracy wherever predictive errors would cause a larger change in the control outputs. In Bayesian decision theory, a decision is evaluated as the expected utility of a decision u or controller π, integrating out any uncertainties. In particular, it is the future trajectories of other agents that are unknown but can be probabilistically predicted according to a model with parameters θ. These aspects of the present disclosure involve loss-calibrated variational inference by defining the gain of a decision or controller's value as a function of the model parameters θ to train.

$$\text{Gain}(\theta) = \int \text{utility}(\pi, y, \hat{y}, x) q_\theta(\hat{y}|x) d\hat{y}. \quad (1)$$

The choice of utility function in Equation (1) is an open one; it defines how desirable a course of actions would be given x and $\hat{y}$. Alternatively, an existing metric like the NLL can simply be weighted without integration. In the next subsection discuss some baseline choices for the utility or weight, and after, two methods are proposed for computing these weights: a self-attention method and a counterfactual method.

A. Baseline Objectives

Conventional predictive metrics are agnostic to the decision u and simply use a delta function to score correct trajectory predictions, recovering the standard log likelihood metric:

$$\text{Gain}_y(\theta) = \int \delta(y, \hat{y}) q_\theta(\hat{y}|x) d\hat{y} = q_\theta(y|x) \quad (2)$$

Nevertheless, aspects of the present disclosure are directed to utilities that are a function of the decision u in order to weight predictions by their downstream effect on the ego's control. For instance, trajectory predictions may be scored based on the resultant ego controls $\pi(\hat{y})$ matching the ego's behavior under knowledge of the true future trajectories $\pi(\hat{y})$:

$$\text{Gain}_\pi(\theta) = \int \delta(\pi(y), \pi(\hat{y})) q_\theta(\hat{y}|x) d\hat{y} \quad (3)$$

This integral, unfortunately, is intractable to derive or estimate, but softer utility functions may be used instead. One example is $\|\pi(\hat{y}) - \pi(y)\|_1$, which may provide a baseline. Optimizing this controller output error guides the learning process towards predicting controller inputs (predicted trajectories) accurately, insofar as they result in the correct control. Any trajectory errors that do not induce a change in the AV's control are thus considered inconsequential and ignored. Some aspects of the present disclosure are directed to an instantiation of a cost function using just the gradients of the controller with respect to the predicted trajectory $\|\nabla_{\hat{y}} \pi(\hat{y})\|_1$, or true trajectory $\|\nabla_y \pi(y)\|_1$. Aspects of the present disclosure illustrate that is not necessary to have differentiable controllers to promote predictive accuracy wherever relevant to control.

B. Proposed Attention Objective

In some aspects of the present disclosure, a method of weighting agent prediction using attention weights between agents x and the AV's future trajectory $y_{ego}$. The predictive model is a function with learned parameters θ noted $q_\theta: X \rightarrow \mathcal{P}_{y \times y_{ego}}$. Where X is the past observation space and $\mathcal{P}_{y \times y_{ego}}$ probability spaces of pedestrian future trajectories $\mathcal{P}_y$ and the ego future trajectories $\mathcal{P}_{y_{ego}}$.

Figure 5A:
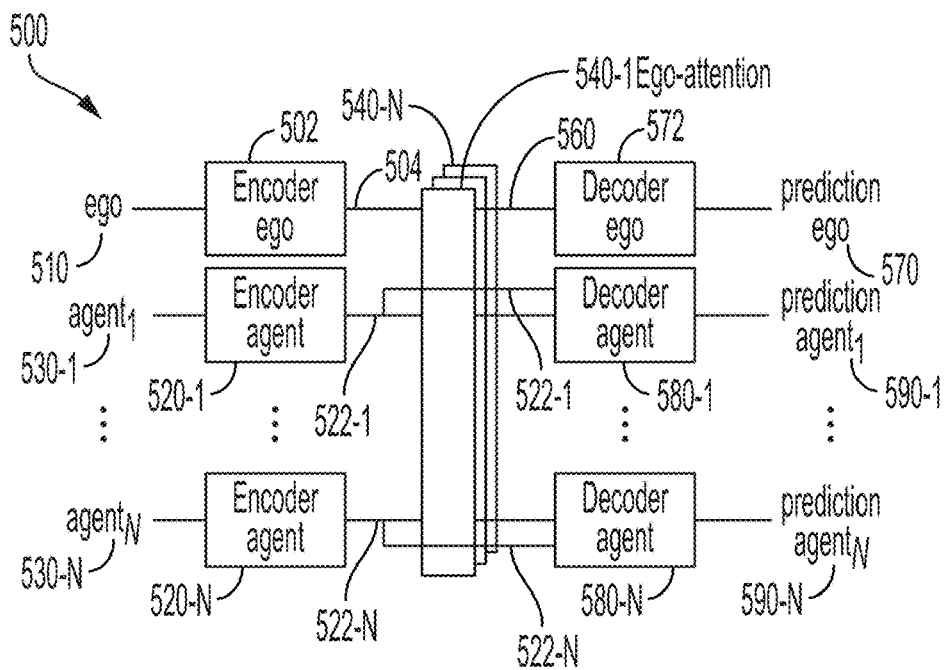
FIGS. 5A and 5B are block diagrams illustrating a gate recurrent unit (GRU) encoder/decoder architecture for trajectory prediction based on a trained attention model, according to aspects of the present disclosure.
Figure 5B:
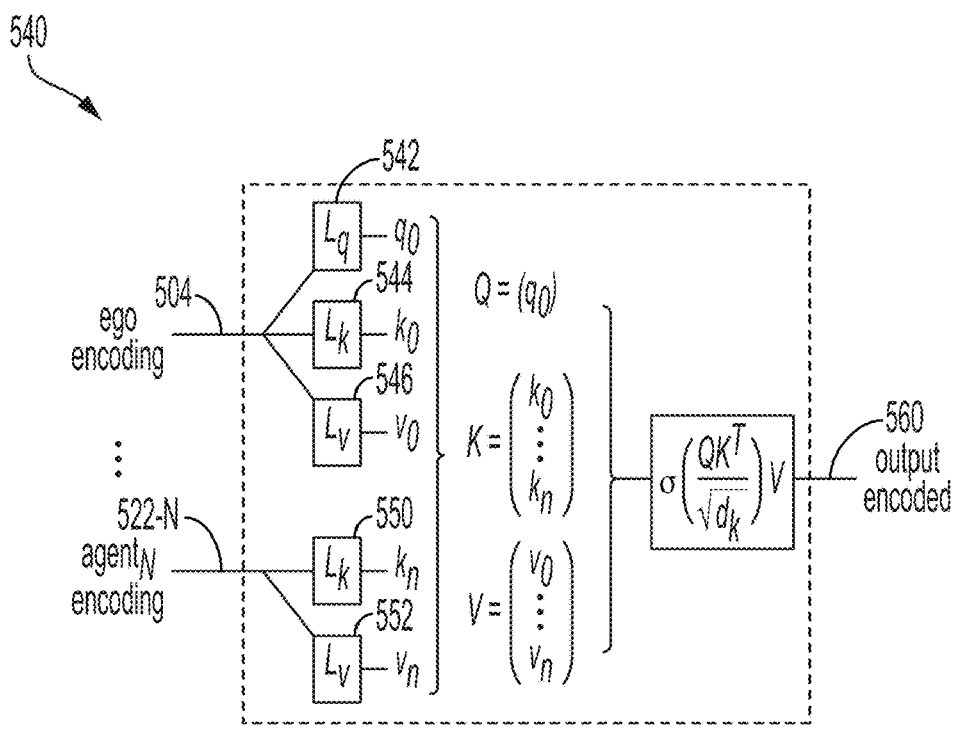

FIGS. 5A and 5B are block diagrams illustrating a gate recurrent unit (GRU) encoder/decoder architecture for trajectory prediction based on a trained attention model, according to aspects of the present disclosure. As shown in FIG. 5A, the GRU encoder-decoder architecture 500 for providing trajectory prediction is configured to perform interactions using attention. For example, the GRU encoder-decoder architecture 500 may support an attention model. Configuration of the GRU encoder-decoder architecture 500 may be performed using a method to train the attention model with multi-head attention on pedestrian agents and a car ego agent.

In some aspects of the present disclosure, the GRU encoder-decoder architecture 500 includes an ego encoder 502 for an ego agent 510. In addition, the GRU encoder-decoder architecture 500 includes agent encoders 520 (520-1, . . . , 520-N) for pedestrian agents 530 (530-1, . . . , 530-N). An ego encoding 504 from the ego encoder 502 and agent encodings 522 (522-1, . . . , 522-N) are provided to ego attention blocks 540 (540-1, . . . , 540-N) from the agent encoders 520. In this configuration, the GRU encoder-decoder architecture 500 also includes an ego decoder 572 that receives an encoded output of the ego attention blocks 540 to generate an ego prediction 570. The GRU encoder-decoder architecture 500 also includes agent decoders 580 (580-1, . . . , 580-N). The agent decoders 580 receive the agent encodings 522 from the agent encoders 520 to generate agent predictions 590. In aspects of the present disclosure, the ego prediction 570 provides a future trajectory prediction of the ego agent 510, and the agent encodings 522 provide future trajectory predictions of the pedestrian agents 530.

FIG. 5B further illustrates the ego attention blocks 540 of FIG. 5A, in some aspects of the present disclosure. In this configuration, the ego attention blocks 540 receive the ego encoding 504 and the agent encodings 522. For example, the ego encoding 504 is provided to a first matrix multiplier 542 to generate an output $q_0$. In addition, the ego encoding 504 is provided to a second matrix multiplier 544 to generate an output $k_0$, and the ego encoding 504 is provided to a third matrix multiplier 546 to generate an output $v_0$. The agent encodings 522 are provided to a matrix multiplier 550 to generate an output $k_n$, and to a matrix multiplier 552 to generate an output $v_n$.

In some aspects of the present disclosure, the ego attention blocks 540 in FIG. 5A are heads of a multi-head attention mechanism. The computation performed by each head is an attention vector according to a Q vector (Q=($q_0$)), a K vector (K=($k_0$, . . . , $k_n$)), and a V vector (V=(v0, . . . , vn)) to generate an encoded output 560:

$$\alpha = \sigma\left(\frac{QK^T}{\sqrt{d_k}}\right) = [\alpha_0, \ldots, \alpha_N], \quad (4)$$

where $\sigma$ denotes the softmax operation that normalizes the attention vector. The encoded output=$\alpha V$ is a weighted mean of the value vectors over the agents (including ego).

In some aspects of the present disclosure, the attention model of the GRU encoder-decoder architecture 500 produces outputs in the form of a sequence of Gaussian mixtures for each agent. In addition, the attention model is trained to minimize the negative log likelihood (NLL) for all agents and the ego trajectory predictions. These aspects of the present disclosure use attention coefficients $\alpha$ as importance factors in a weighted sum of per-human state prediction loss (as opposed to uniform weighting). An algorithm shown in Table 1 summarizes how the attention model is trained with importance weighting. For example, if multiple heads are used, they are averaged:

$$qw_n = \frac{1}{H}\sum_{h=1}^{H}\alpha_n^{(h)} \quad (5)$$

In some aspects of the present disclosure, an attention predictor according to Equation (4) imitates a planner that interacts with the pedestrians to avoid collision. One way for the predictor to interact with the pedestrians is through attention. Therefore, as the attention model learns the correlations between the planner's trajectories and the agents trajectories, larger attention coefficients are given to the agents that cause larger reactions from the controller. In these aspects of the present disclosure, the attention model learns the agents that cause larger reactions from the controller offline and does not access the controller nor its gradient.

Predicting both the ego trajectory and the pedestrians at the same time allows the use of attention coefficients for concern weighting of the pedestrians in a single run. Note that the ego's self-attention $\alpha_0$ is not used to weight the loss; it quantifies how independent the ego is from the other agents.

Algorithm 1, as shown, provides a training method to define a concern about an agent but not about specific trajectories of that agent. For example, the training method may define the concern without using the controller because the training method uses an offline-learned model that imitates the controller.

| Algorithm 1 Control-Aware Prediction Objectives (Attention) |
|---|
| Input: Controller: $\pi : \chi \to \mathcal{U}$ |
| 1:  Record trajectory data $\mathcal{D} = \{x, y\}_i$ |
| 2:  while training do |
| 3:      Sample batch x, y~D |
| 4:      Run attention model to estimate $\hat{y}_{ego}$ and $\hat{y}$ from x |
| 5:      Get attention: $\alpha(x)$    ▷ Eq. (4) |
| 6:      Compute weight: $w(\alpha(x))$    ▷ Eq. (5) |
| 7:      Update model: |
|         $\theta \leftarrow \theta + w(x)\nabla_\theta \log q_\theta(y|x) + \nabla_\theta \log q_\theta(y_{ego}|x)$ |
| Output: Predictive model $q_\theta: \chi \to \mathcal{F}_{y\times y_{ego}}$ |

In this implementation, Controller: $\pi:X \to \mathcal{U}$ is provided as an input to the control-aware prediction objective process shown in Table 1. In this example, $x \in X$ denotes past trajectory information about all agents in a scene, and the AV controller $\pi$ outputs ego controls $u \in \mathcal{U}$ to anticipate and avoid colliding with other agents' future trajectories: u=$\pi$(y). At step 1, trajectory data $\mathcal{D} = \{x,y\}_i$ is recorded. At step 2, a training loop is initiated which repeats steps 3 to 6 until a predictive model is output. At step 3, a batch of past agent trajectory information (x) and future agent trajectory information (y) is sampled from the recorded trajectory data x, y~ $\mathcal{D}$. At step 4, an attention model is run to estimate a future ego trajectory $\hat{y}_{ego}$ and a future agent trajectory $\hat{y}$ from the past agent trajectories x. At step 5, an attention: $\alpha(x)$ is computed according to Equation (4). At step 6, a weight: $w(\alpha(x))$ is computed according to Equation (5). At step 7, the model is updated: $\theta \leftarrow \theta + w(x)\nabla_\theta \log q_\theta(y|x) + \nabla_\theta \log q_\theta(y_{ego}|x)$ based on the weight w(x) and the NLLs of the known previous x and future trajectories y and the estimated future ego trajectory $\hat{y}_{ego}$. The control-aware prediction objective process outputs the predictive model $q_\theta: X \to \mathcal{P}_{y\times y_{ego}}$.

C. Proposed Counterfactual Action Discrepancy Objective

This second proposal can also be formulated as a re-weighted maximization objective, where the log likelihood of each agent's trajectory in a scene is weighted by its individual contribution to the ego's control decision. In some aspects of the present disclosure, weighting of the agent's trajectory based on its individual contribution to the ego's control decision is performed as follows. First, enumerating is performed through each agent in a scene, and counterfactual outputs from the AV's controller are computed as if every agent traversed their individual trajectory as recorded in the replay buffer, except for agent n. Next, the trajectory that the nth agent might otherwise have taken, $\hat{y}_n^k \sim q_\theta(\hat{y}_n|x)$, is resampled and the control output that would result is computed as:

$$\hat{u}_n^k = \pi(\{\hat{y}_n^k\} \cup y \backslash \{y_n\}), \quad (6)$$

to compare against the control had no agent deviated from their recorded trajectories:

$$u = \pi(y). \quad (7)$$

The difference in these two hypothetical controls corresponds to how much an individual agent affects the ego vehicle, and can represent the concern associated with predicting this particular agent in this particular instance accurately. If the model is probabilistic, then taking multiple samples (K>1) helps ensure high importance even if the pedestrian only might cause a control deviation:

$$w_n = \max_{k \in \{1...K\}} \|u - \hat{u}_n^k\|_1, \quad (8)$$

which are used as weights for predictive model training:

$$\theta^* = \mathop{\mathrm{argmax}}_\theta \sum_{n=1}^N w_n \log q_\theta(y_n | x) \quad (9)$$

In one aspect of the present disclosure, a method for counterfactual action discrepancy is summarized in the pseudo code for control-aware prediction objects as shown in Algorithm 2. Implementation of a predictive model $q_\theta$, in some aspects of the present disclosure, takes as inputs the previous three locations of a human agent, passing through three fully connected layers, to output a Gaussian distribution delta state at the next point in time. For full state predictions, the prediction is bootstrapped T times.

---

Algorithm 2 Control-Aware Prediction Objectives (Weighted)

Input: Controller: $\pi : \chi \to \mathcal{U}$
1: Record trajectory data $\mathcal{D} = \{x, y\}_i$
2: while training do
3:    Sample batch x, y~D
4:    Compute hypothetical controls:: u, $\hat{u}_n^k$ ▷ Eq. (6) - (7)
5:    Compute weight: w(u, $\hat{u}_n^k$)     ▷ Eq. (8)
6:    Update model: $\theta \leftarrow \theta + w(u, \hat{u}_n^k)\nabla_\theta \log q_\theta(y|x)$
Output: Predictive model $q_\theta: \chi \to \mathcal{P}_y$

---

In this implementation, Controller: $\pi: X \Theta \mathcal{U}$ is provided as an input to the control-aware prediction objective process shown in Table 1. In this example, $x \in X$ denotes past trajectory information about all agents in a scene, and the AV controller $\pi$ outputs ego controls $u \in \mathcal{U}$ to anticipate and avoid colliding with other agents' future trajectories: $u = \pi(y)$. At step 1, trajectory data $\mathcal{D} = \{x,y\}_i$ is recorded. At step 2, a training loop is initiated which repeats steps 3 to 6 until a predictive model is output. At step 3, a batch of past agent trajectory information (x) and future agent trajectory information (y) is sampled from the recorded trajectory data $x, y \sim \mathcal{D}$. At step 4, hypothetical controls u, $\hat{u}_n^k$ are computed using Equations (6) and (7). At step 5, a weight: $w(u, \hat{u}_n^k)$ is computed according to Equation (8). At step 6, the model is updated $\theta \leftarrow \theta + w(u, \hat{u}_n^k)\nabla_\theta \log q_\theta(y|x)$ based on the weight: $w(u, \hat{u}_n^k)$ and the NLLs of the known previous x and future trajectories y. The control-aware prediction objective process outputs the predictive model $q_\theta: X \to \mathcal{P}_y$.

D. Summary of Objectives

There are various choices for utilities, or weights for traditional module metrics. In Table II several baseline methods are summarized, including NLL and instantiations of prior work as well as attention based weighting, according to aspects of the present disclosure.

TABLE II

Comparison of utilities and weighted objectives

| Method | Cite | Utility or Weight | Objective $\mathcal{L}(\theta)$ |
|---|---|---|---|
| Baselines: | | | |
| R2P2 Gain$_y$ | [29] | $\delta(y, \hat{y})$ | $q_\theta(y\|x)$ |
| R2P2 Gain$_{\pi1}$ | | $\|\pi(y) - \pi(\hat{y})\|_1$ | $\mathbb{E}_{\hat{y}}[\|\pi(y) - \pi(\hat{y})\|_1]$ |
| R2P2 Weight$_{\nabla \hat{y}}$ | [13] | $\|\nabla_{\hat{y}} \pi(\hat{y})\|_1$ | $\mathbb{E}_{\hat{y}}[\|\nabla_{\hat{y}}\pi(\hat{y})\|_1]q_\theta(y\|x)$ |
| R2P2 Weight$_{\nabla y}$ | [13] | $\|\nabla_y \pi(y)\|_1$ | $\|\nabla_y \pi(y)\|_1 q_\theta(y\|x)$ |
| Ours: | | | |
| R2P2 Weight$_\pi$ | | $\|\pi(y) - \pi(\hat{y})\|_1$ | $\mathbb{E}_{\hat{y}}[\|\pi(y) - \pi(\hat{y})\|_1]q_\theta(y\|x)$ |
| R2P2 Weight$_{\pi k}$ | | $\max_k \|\pi(y) - \pi(\hat{y}^k)\|_y$ | $\max_k \|\pi(y) - \pi(\hat{y}^k)\|_1 q_\theta(y\|x)$ |
| AttentionWeight | | $\alpha(x)$ | $\alpha(x) q_\theta(y\|x)$ |

Evaluation of the disclosed control-aware prediction objective (CAPO) methods involves consideration of pedestrian trajectory prediction, which is a representative scenario that is commonplace in autonomous driving. In practice, the majority of pedestrian behaviors can safely be ignored by the autonomous vehicle's autonomy stack; however, in rare cases of pedestrian-ego interaction (e.g., road crossings), accurate prediction of pedestrian behavior becomes crucial in avoiding collisions. This sparsity of interaction showcases how predictive models may perform well with respect to traditional metrics (e.g., average displacement error (ADE)) while still leading to suboptimal ego behavior when it matters most. The following description details experimental evaluation and implementation of the aforementioned scenario within an autonomous driving simulator. Next, results are compared between the disclosed CAPO methods and the various baselines discussed in Table II. Aspects of the present disclosure illustrate that the predictive models trained using the disclosed CAPO methods produce safe behavior with fewer collisions relative to other baselines noted in Table III.

In the following description, several scenarios are devised in the following examples that include other agents, whose behavior is context-dependent, and whose apparent behavior depends on their proximity to the ego vehicle (e.g., the closer they are, the less the observation noise on their motions). The following three scenarios are described, which involve pedestrians and other vehicles. A single vehicle is commanded to drive down a road that is adjacent to sidewalks which are populated with pedestrians. Occasionally, a pedestrian will cross the street and the ego agent must slow to avoid a collision when necessary.

Pedestrian Crossing Scenario

Figure 6:
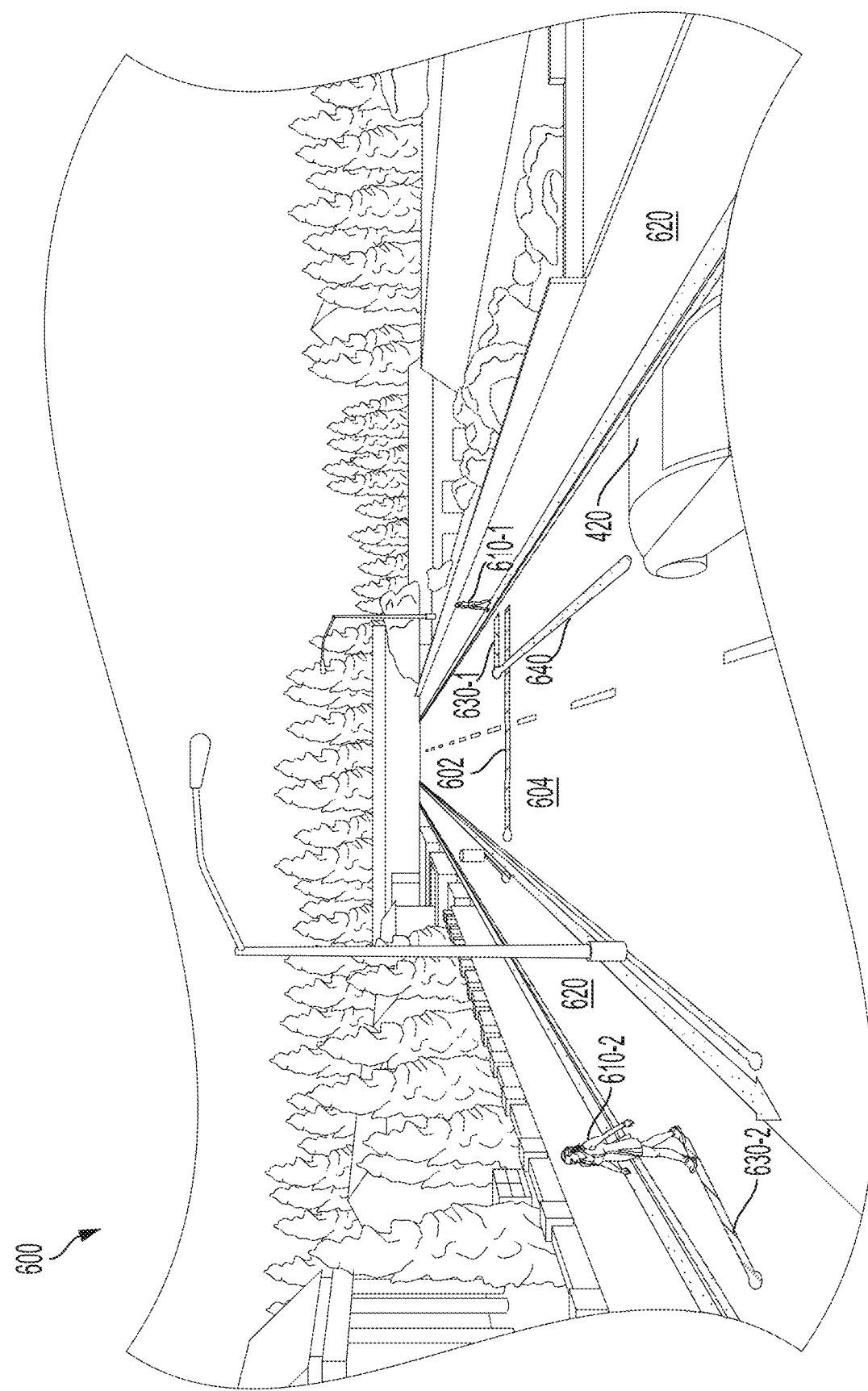
FIG. 6 is a drawing of a roadway environment illustrating a pedestrian crossing scenario relative to an ego vehicle approaching a crosswalk in which a collision is predicted by the ego vehicle, according to aspects of the present disclosure.

FIG. 6 is a drawing of a roadway environment 600 illustrating a pedestrian crossing scenario relative to an ego vehicle 420 approaching a crosswalk 602, in which a collision is predicted by the ego vehicle 420, according to aspects of the present disclosure. In this scenario, an ego vehicle 420 is driving along a road 604 with many pedestrians 610 nearby. The pedestrians 610 are generally walking along on a sidewalk 620, and some cross the road 604. In this example, the pedestrians 610 walk at different speeds (e.g., between 0-2 m/s) on the sidewalk 620, walk around each other to avoid collisions, sometimes pausing outside shops, and sometimes crossing the road.

In the pedestrian prediction scenario shown in FIG. 6, pedestrians 610 spawn on the sidewalk 620 and the ego vehicle 420 predicts the pedestrian trajectories 630 (e.g., 630-1 and 630-2) within the next 3 seconds. Some of the pedestrians 610 may cross the road 604 at right angles, as shown by a crossing pedestrian trajectory 630-1. In this example, a planner of the ego vehicle 420 predicts a collision with a crossing pedestrian 610 and starts slowing down, as shown by an ego trajectory prediction 640 up to the crossing pedestrian trajectory 630-1, but not further).

As shown in FIG. 6, the crossing pedestrian 610-1 randomly decides to cross the road 604 at the crosswalk 602 and does so quickly (e.g., 2 m/s) in the shortest path possible (perpendicular to the road direction). In this example, the ego vehicle 420 is approaching the crosswalk 602, in which a collision is predicted by the ego vehicle 420 with the crossing pedestrian 610-1 unless the ego vehicle 420 performs the action of applying the brakes.

Figure 7:
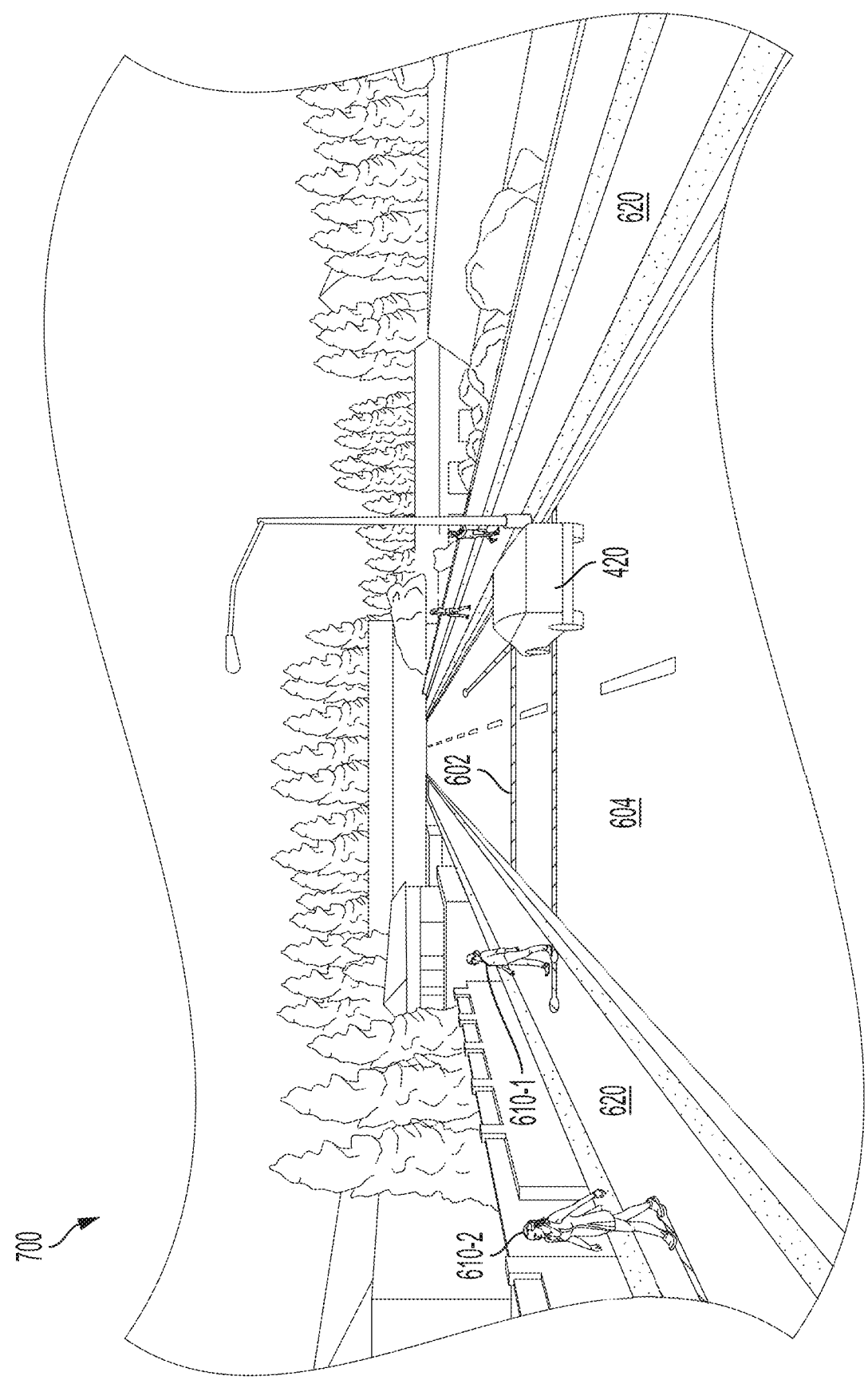
FIG. 7 is a drawing of the roadway environment illustrating the pedestrian crossing scenario relative to the ego vehicle approaching the crosswalk of FIG. 6, in which no collision is predicted by the ego vehicle, according to aspects of the present disclosure.

FIG. 7 is a drawing of a roadway environment 700 illustrating the pedestrian crossing scenario relative to an ego vehicle approaching the crosswalk 602 of FIG. 6, in which no collision is predicted by the ego vehicle, according to aspects of the present disclosure. In these example, no collision is predicted because the crossing pedestrian 610-1 has crossed the crosswalk 602. These aspects of the present disclosure provide a control-aware prediction objective model that recognizes only the (simple) road-crossing behavior is important to model. All the (complex) sidewalk motions, such as a second pedestrian 610-2 are not important with respect to planning of the ego vehicle 420.

Figure 8:
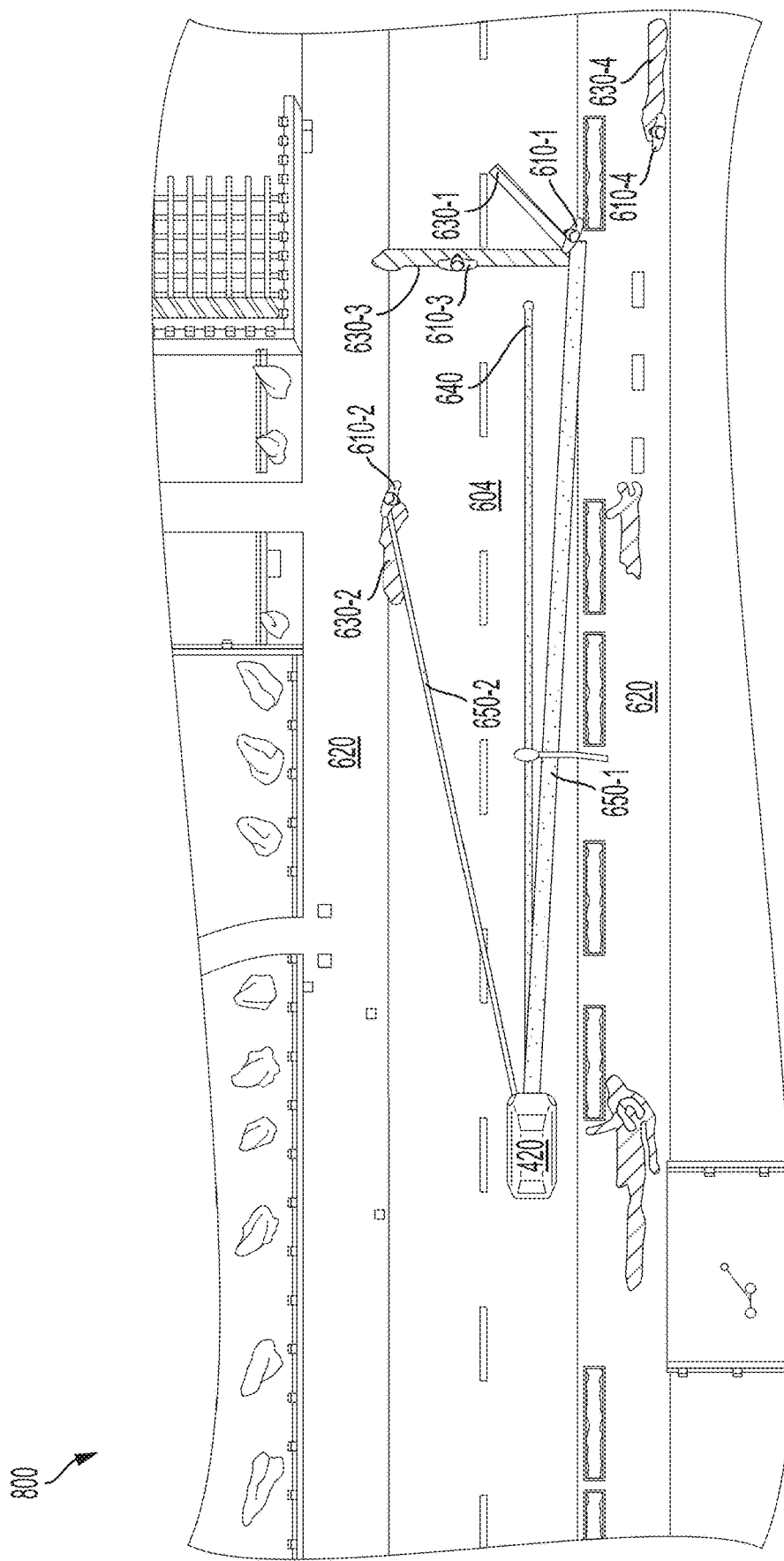
FIG. 8 is an overhead view of a roadway environment illustrated in FIG. 6 of the pedestrian crossing scenario, according to aspects of the present disclosure.

FIG. 8 is an overhead view of a roadway environment 800 illustrated in FIG. 6 of the pedestrian crossing scenario, according to aspects of the present disclosure. In this example, the ego vehicle 420 drives along the road 604 while reacting to the pedestrians 610 (610-1, 610-2, 610-3, and 610-4) with predicted pedestrian trajectories 630 (630-1, 630-2, 630-3, and 630-4). In aspects of the present disclosure, the disclosed, control-aware prediction objectives (CAPO) process learns to capture which trajectory predictions should have more influence on the vehicle's controls. In this example, a primary attention 650-1 of the ego vehicle 420 is focused of the crossing pedestrian 610-1. In addition, a secondary attention 650-2 of the ego vehicle 420 is focused of the crossing pedestrian 610-2.

As shown in FIGS. 6-8, the pedestrians 610 spawn at random locations on the sidewalk 620 and are then provided a long-range navigation goal that is also uniformly sampled from the sidewalk 620. When the long-range goal is reached, another is sampled to replace it. To induce pseudo-random motion, a short-range goal is also generated at each time step. This goal is generated by projecting point 4 meters along the path to the long-range goal, starting at the pedestrian's location. The lateral offset $\beta_{t+1}$ of the short-range goal is generated by sampling from a normal distribution centered about the previous lateral offset $\beta_t$ after it has been scaled down (to drive it towards the long-range goal):

$$\beta_{t+1} = (1-\epsilon)\beta_t + \mathcal{N}(0,\sigma^2), \quad (10)$$

where $\sigma$ is the variance of the noise, and $\epsilon \in [0, 1)$ is the commitment to the long-range goal.

When on the sidewalk 620, the pedestrians 610 are programmed to walk at speeds sampled about 2 meters per second (m/s) while navigating around other pedestrians 610 to avoid collisions and, occasionally, pausing outside of shops. Each different kind of the pedestrians 610 is defined with various noise levels, commitment, and stopping chance. For example, the pedestrians 610 may randomly decide to cross the road 604. The probability increases if their velocity vector points towards the road 604 and increases greatly when the pedestrians 610 are close to the road 604. While crossing, the pedestrians 610 travel at 2 m/s in the shortest path possible (e.g., perpendicular to the road direction. To increase task difficulty, the probability that the pedestrians 610 cross the road 604 is increased at test time.

Compared Models

1) Oracle Distribution

The pedestrian behavior is modeled with a known distribution at each time step. However, the planner needs predictions over several time steps. The trajectory distribution is approximated by sampling 5 trajectories for each pedestrian. The planner reacts to the trajectory that would cause the closest intersection with its desired path. This is the true distribution but it is not biased toward the concern and using it with a few samples does not give the best results.

2) Attention Weighting

As presented in section B, this model is trained with the algorithm 1 and as a baseline, it is compared with a training using uniform weights instead of those computed from attention.

3) Reparametrized Push Forward Policy (R2P2)

The likelihood-based multi-agent prediction algorithm R2P2 is used as baseline $Gain_y$, and also R2P2 is used as the base model for all other predictive models apart from the attention model. R2P2 is an autoregressive normalizing flow, capable of expressing multimodal agent trajectories, trained with NLL. In this example, R2P2 are parameterized to predict 30 steps with data at 10 Hz, corresponding to a 3s prediction for all pedestrians. When sampling, K=10 samples are taken.

TABLE III

Scenario results. 100 episodes.

| Predictive Model | Success Rate ↑ | Collisions ↓ | Speed (m/s) ↑ | Jerk (m/s⁻³) ↓ | ADE (m) ↓ | Control Error ↓ |
|---|---|---|---|---|---|---|
| baselines | | | | | | |
| R2P2 $Gain_y$ | 89.0% | 11 | 9.97 ± 0.222 | 8.02 ± 0.250 | 2.00 ± 0.024 | 0.59 ± 0.012 |
| R2P2 $Gain_{xl}$ | 85.0% | 14 | 10.45 ± 0.208 | 6.65 ± 0.196 | 3.48 ± 0.038 | 0.63 ± 0.016 |

TABLE III-continued

Scenario results. 100 episodes.

| Predictive Model | Success Rate ↑ | Collisions ↓ | Speed (m/s) ↑ | Jerk (m/s⁻³) ↓ | ADE (m) ↓ | Control Error ↓ |
|---|---|---|---|---|---|---|
| R2P2 Weight$_{\nabla \tilde{y}}$ | 94.0% | 4 | 9.53 ± 0.216 | 8.21 ± 0.140 | 1.98 ± 0.024 | 0.60 ± 0.012 |
| R2P2 Weight$_{\nabla y}$ | 91.0% | 9 | 9.74 ± 0.216 | 8.74 ± 0.184 | 2.00 ± 0.025 | 0.60 ± 0.011 |
| Attention | 89.0% | 11 | 13.79 ± 0.214 | 4.48 ± 0.147 | 2.61 ± 0.050 | 0.63 ± 0.026 |
| our methods | | | | | | |
| R2P2 Weight$_\pi$ | 93.0% | 7 | 8.66 ± 0.188 | 9.26 ± 0.194 | 2.29 ± 0.022 | 0.58 ± 0.010 |
| R2P2 Weight$_{\pi k}$ | 99.0% | 1 | 9.46 ± 0.196 | 7.89 ± 0.159 | 2.14 ± 0.018 | 0.55 ± 0.011 |
| Attention Weight$_\alpha$ | 91.0% | 9 | 14.36 ± 0.217 | 4.22 ± 0.154 | 2.58 ± 0.053 | 0.64 ± 0.024 |
| oracle distribution | 98.0% | 2 | 10.54 ± 0.231 | 6.80 ± 0.180 | 1.58 ± 0.036 | 0.51 ± 0.013 |

Arrows indicate higher/lower preferred.
Standard errors shown.
Best.
second.

Metrics

Table III presents results for 100 sequences. The performance of the system (e.g., prediction and planner) is tracked according to a success rate and a number of collisions. In this example, three conditions may end a sequence:

Success: vehicles traverse 200 meter road without incident.
Collision: a pedestrian was hurt.
Time out: the car was too slow (>60 s).

This comparison scores efficiency and comfort indicators by average speed and average jerk, respectively. Finally, the average pedestrian trajectory prediction errors are computed as well as their downstream effect on the planner with an average displacement error (ADE) and a control error equal to $\|\pi(y) - \pi(\hat{y})\|_1$. The control error measures the downstream effect of the prediction error on the ego's plans.

The results in Table III show that all methods do reasonably well; specifically, weighting predictive objectives by their downstream effect does improve downstream performance as illustrated by a low collision count and control error. While methods such as R2P2 Weight$_{\nabla \tilde{y}}$ assume a differentiable controller, this assumption does not need to be made, and the disclosed CAPO methods can work with any type of controller. While the disclosed CAPO methods did not score as well on the ADE metric of agents' trajectories, they did score best on the metric that matters more: the control error, thus mitigating error propagated downstream and improving the end task performance. The disclosed CAPO methods take into account the full predictive distribution when computing a weighting.

Modular autonomous systems (such as those commonly used in autonomous vehicles) provide a number of advantages, but generally incur the disadvantage that individual components typically do not directly optimize for system-wide or downstream performance metrics. Aspects of the present disclosure propose metrics for learning prediction models that account for the downstream objective without imposing stringent specifications on downstream components (such as end-to-end differentiability). These metrics weight the usual likelihood objective, either using attention weights derived from a behavior-cloned policy, or using the impact that substituting predicted trajectories for ground-truth trajectories has on planner output. Accounting for the downstream objective in this manner encourages prediction models to focus on what is important—either at the agent or individual trajectory level—and, as a result, improves system-wide performance, as demonstrated empirically in a realistic pedestrian jaywalking scenario described above.

Figure 9:
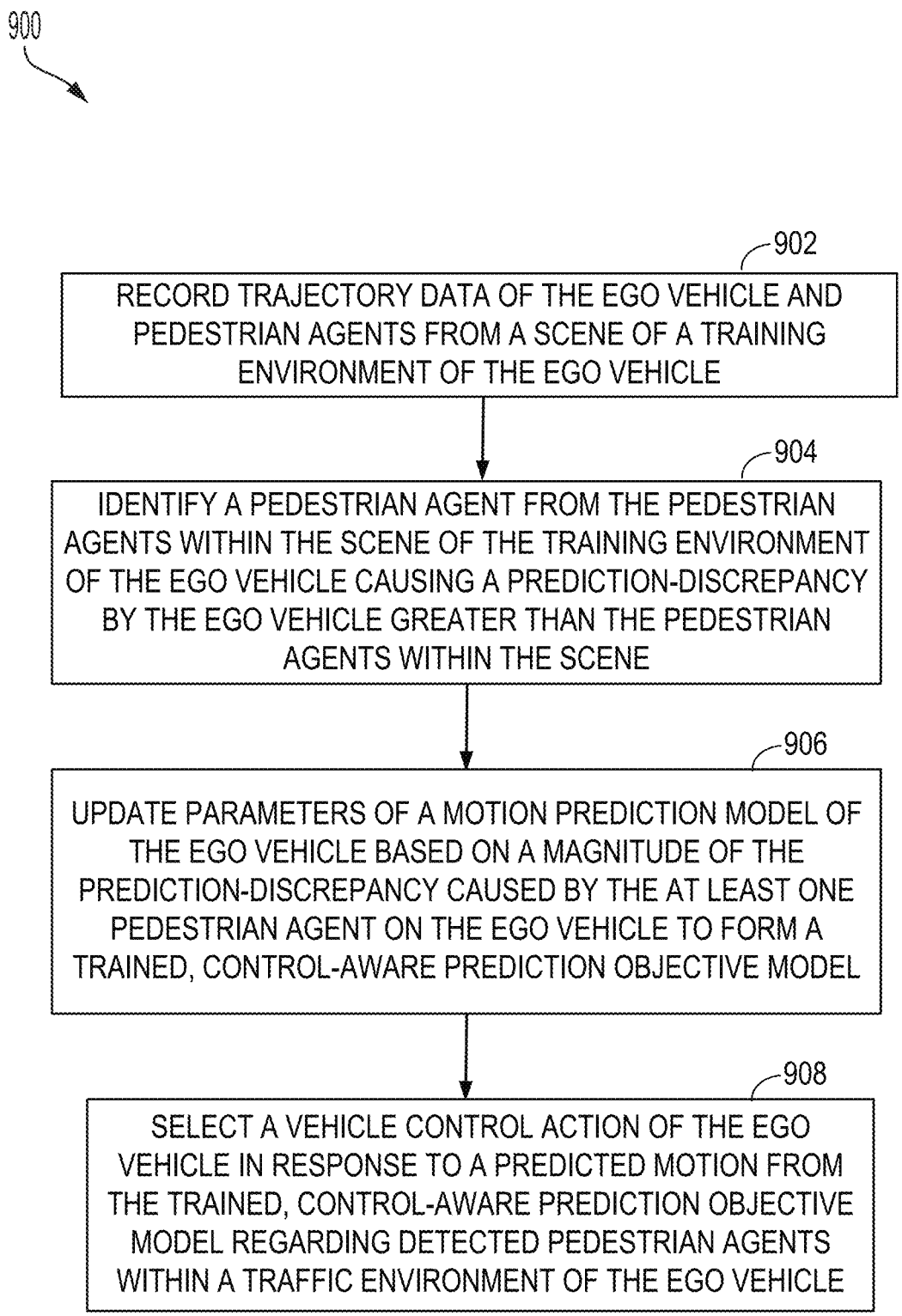
FIG. 9 is a flowchart illustrating a method of generating an output trajectory of an ego vehicle, according to aspects of the present disclosure.

FIG. 9 is a flowchart illustrating a method of generating an output trajectory of an ego vehicle, according to aspects of the present disclosure. A method 900 begins at block 902, in which trajectory data of the ego vehicle and pedestrian agents is recorded from a scene of a training environment of the ego vehicle. At step 1 of Algorithm 1, trajectory data $\mathcal{D} = \{x, y\}_i$, of past agent trajectory information (x) and future agent trajectory information (y) is recorded. At step 2, a training loop is initiated which repeats steps 3 to 6 until a predictive model is output. At step 3, a batch of past agent trajectory information (x) and future agent trajectory information (y) is sampled from the recorded trajectory data x,y~$\mathcal{D}$.

At block 904, a pedestrian agent from the pedestrian agents within the scene of the training environment of the ego vehicle causing a prediction-discrepancy by the ego vehicle greater than the pedestrian agents within the scene is identified. For example, as shown in Algorithm 1, at step 4, an attention model is run to estimate a future ego trajectory $\hat{y}_{ego}$ and a future agent trajectory $\hat{y}$ from the past agent trajectories x. At step 5, an attention: $\alpha(x)$ is computed according to Equation (4). At step 6, a weight: $w(\alpha(x))$ is computed according to Equation (5). These aspects of the present disclosure use attention coefficients $\alpha$ as importance factors in a weighted sum of per-human state prediction loss (as opposed to uniform weighting). Therefore, as the attention model learns the correlations between the planner's trajectories and the agents' trajectories, larger attention coefficients are given to the agents that cause larger reactions from the controller. In these aspects of the present disclosure, the attention model learns the agents that cause larger reactions from the controller offline and does not access the controller nor the controller gradient.

According to the Algorithm 2, at step 4, hypothetical controls u, $\hat{u}_n^k$ are computed using Equations (6) and (7). At step 5, a weight: $w(u, \hat{u}_n^k)$ is computed according to Equation (8). In this aspect of the present disclosure, a difference in these two hypothetical controls u, $\hat{u}_n^k$ corresponds to how much an individual agent affects the ego vehicle, and can represent the concern associated with predicting this particular agent in this particular instance accurately. This second proposal can also be formulated as a re-weighted maximization objective, where the log likelihood of each agent's trajectory in a scene is weighted by its individual contribution to the ego's control decision.

At block 906, parameters of a motion prediction model of the ego vehicle are updated based on a magnitude of the prediction-discrepancy caused by the at least one pedestrian agent on the ego vehicle to form a trained, control-aware prediction objective model. For example, as shown in Algorithm 1, at step 7, the model is updated $\theta \leftarrow \theta + w(x)\nabla_\theta \log q_\theta(y|x) + \nabla_\theta \log q_\theta(y_{ego}|x)$ based on the weight $w(x)$ and the NLLs of the known previous x and future trajectories y and the estimated future ego trajectory $\hat{y}_{ego}$. The control-aware prediction objective process outputs the predictive model $q_\theta: X \rightarrow \mathcal{P}_{y \times y_{ego}}$. By contrast, according to Algorithm 2, at step 6, the model $\theta \leftarrow \theta + w(u, \hat{u}_n^k)\nabla_\theta \log q_\theta(y|x)$ is updated based on the weight: $w(u, \hat{u}_n^k)$ and the NLLs of the known previous x and future trajectories y. The control-aware prediction objective process outputs the predictive model $q_\theta: X \rightarrow \mathcal{P}_y$.

At block 908, a vehicle control action of the ego vehicle is selected in response to a predicted motion from the trained, control-aware prediction objective model regarding detected pedestrian agents within a traffic environment of the ego vehicle. For example, as shown in FIG. 6, the crossing pedestrian 610-1 randomly decides to cross the road 604 at the crosswalk 602 and does so quickly (e.g., 2 m/s) in the shortest path possible (perpendicular to the road direction). In this example, the ego vehicle 420 is approaching the crosswalk 602, in which a collision is predicted by the ego vehicle 420 with the crossing pedestrian 610-1 unless the ego vehicle 420 performs an action of applying the brakes. As shown in FIG. 7, no collision is predicted by the ego vehicle 420. In this example, no collision is predicted because the crossing pedestrian 610-1 has crossed the crosswalk 602. These aspects of the present disclosure provide a control-aware prediction objective model that recognizes only the (simple) road-crossing behavior is important to model. All the (complex) sidewalk motions, such as the second pedestrian 610-2, are not important with respect to planning of the ego vehicle 420.

The method 900 also includes selecting an nth pedestrian agent in the scene: enumerating each of the pedestrian agents in the scene other than the nth pedestrian agent. The method 900 further includes computing control outputs from a controller of the pedestrian agents according to the recorded trajectory data. The method 900 also includes resampling a different trajectory from a known trajectory of the nth agent, $\hat{y}_u^k \sim q_\theta(\hat{y}_n|x)$; computing a control output from the ego vehicle controller according to the different trajectory $\hat{u}_n^k = \pi(\{\hat{y}_n^k\} \cup y \backslash \{y_n\})$. The method 900 further includes comparing the control output against control outputs of the pedestrian agents according to the recorded trajectory data $u = \pi(y)$.

Autonomous vehicle software is typically structured as a modular pipeline of individual components (e.g., perception, prediction, and planning) to help separate concerns into interpretable sub-tasks. Even when end-to-end training is possible, each module has its own set of objectives used for safety assurance, sample efficiency, regularization, or interpretability. Nevertheless, intermediate objectives do not always align with overall system performance. For example, optimizing the likelihood of a trajectory prediction module might focus more on easy-to-predict agents than safety-critical or rare behaviors (e.g., jaywalking). Some aspects of the present disclosure present control-aware prediction objectives (CAPOs), to evaluate the downstream effect of predictions on control without specifying a differentiable planner. These aspects of the present disclosure propose two types of importance weights that weight the predictive likelihood: (1) one using an attention model between agents, and (2) another based on control variation when exchanging predicted trajectories for ground truth trajectories.

In some aspects, the methods shown in FIG. 9 may be performed by the SOC 100 (FIG. 1) or the software architecture 200 (FIG. 2) of the autonomous vehicle 150. That is, each of the elements or method may, for example, but without limitation, be performed by the SOC 100, the software architecture 200, the processor (e.g., CPU 102) and/or other components included therein of the autonomous vehicle 150, or the vehicle action planner system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of generating an output trajectory of an ego vehicle, the method comprising:
    recording trajectory data of the ego vehicle and pedestrian agents from a scene of a training environment of the ego vehicle;
    selecting an nth pedestrian agent in the scene;
    enumerating each of the pedestrian agents in the scene other than the nth pedestrian agent;
    computing control outputs from a controller of the pedestrian agents according to the recorded trajectory data;
    resampling a different trajectory from a known trajectory of the nth agent, $\hat{y}_n^k \sim q_\theta(\hat{y}_n|x)$;
    computing a control output from the ego vehicle controller according to the different trajectory $\hat{u}_n^k = \pi(\{\hat{y}_n^k\} \cup y \backslash \{y_n\})$;
    comparing the control output against control outputs of the pedestrian agents according to the recorded trajectory data $u = \pi(y)$ to identify at least one pedestrian agent causing a prediction-discrepancy by the ego vehicle greater than the pedestrian agents within the scene;
    updating parameters of a motion prediction model of the ego vehicle based on a magnitude of the prediction-discrepancy caused by the at least one pedestrian agent on the ego vehicle to form a trained, control-aware prediction objective model; and
    selecting a vehicle control action of the ego vehicle in response to a predicted motion from the trained, control-aware prediction objective model regarding detected pedestrian agents within a traffic environment of the ego vehicle.

2. The method of claim 1, in which updating parameters comprises:
    predicting, using the motion prediction model, a future motion of the pedestrian agents and a future motion of the ego vehicle based on the recorded trajectory data; and
    computing an attention vector according to the future motion of the pedestrian agents and a future motion of the ego vehicle.

3. The method of claim 2, in which the updating of parameters comprises:
    computing a weighted sum according to the attention vector; and
    training the motion prediction model according to the weight sum to learn correlations between planner trajectories and agent trajectories; and
    assigning larger attention coefficients to the at least one agent causing the prediction-discrepancy from a controller of the ego vehicle.

4. The method of claim 1, in which the updating of parameters comprises:
    computing a weight for the nth agent according to the control output of the nth agent relative to the control outputs of the pedestrian agents; and
    updating the motion prediction model according to the computed weight.

5. The method of claim 1, further comprising performing the vehicle control action to maneuver the ego vehicle according to the predicted motion of the detected pedestrian agents within the traffic environment of the ego vehicle.

6. The method of claim 1, in which the vehicle control action comprises throttling, steering, and/or braking.

7. The method of claim 1, in which updating the parameters comprises training the trained, control-aware prediction objective model to weight a log likelihood of a trajectory of each of the pedestrian agents in the scene by a respective contribution of the pedestrian agents to a control decision of the ego vehicle.

8. A non-transitory computer-readable medium having program code recorded thereon for generating an output trajectory of an ego vehicle, the program code being executed by a processor and comprising:
    program code to record trajectory data of the ego vehicle and pedestrian agents from a scene of a training environment of the ego vehicle;
    program code to select an nth pedestrian agent in the scene;
    program code to enumerate each of the pedestrian agents in the scene other than the nth pedestrian agent;
    program code to compute control outputs from a controller of the pedestrian agents according to the recorded trajectory data;
    program code to resample a different trajectory from a known trajectory of the nth agent, $\hat{y}_n^k \sim q_\theta(\hat{y}_n|x)$;
    program code to compute a control output from the ego vehicle controller according to the different trajectory $\hat{u}_n^k = \pi(\{\hat{y}_n^k\} \cup y \backslash \{y_n\})$;
    program code to compare the control output against control outputs of the pedestrian agents according to the recorded trajectory data $u = \pi(y)$ to identify at least one pedestrian agent causing a prediction-discrepancy by the ego vehicle greater than the pedestrian agents within the scene;
    program code to update parameters of a motion prediction model of the ego vehicle based on a magnitude of the prediction-discrepancy caused by the at least one pedestrian agent on the ego vehicle to form a trained, control-aware prediction objective model; and program code to select a vehicle control action of the ego vehicle in response to a predicted motion from the trained, control-aware prediction objective model regarding detected pedestrian agents within a traffic environment of the ego vehicle.

9. The non-transitory computer-readable medium of claim 8, in which the program code to update parameters comprises:

program code to predict, using the motion prediction model, a future motion of the pedestrian agents and a future motion of the ego vehicle based on the recorded trajectory data; and program code to compute an attention vector according to the future motion of the pedestrian agents and a future motion of the ego vehicle.

10. The non-transitory computer-readable medium of claim 9, in which the program code to update the parameters comprises:

program code to compute a weighted sum according to the attention vector;

program code to train the motion prediction model according to the weight sum to learn correlations between planner trajectories and agent trajectories; and program code to assign larger attention coefficients to the at least one agent causing the prediction-discrepancy from a controller of the ego vehicle.

11. The non-transitory computer-readable medium of claim 8, in which the program code to update the parameters comprises:

program code to compute a weight for the nth agent according to the control output of the nth agent relative to the control outputs of the pedestrian agents; and program code to update the motion prediction model according to the computed weight.

12. The non-transitory computer-readable medium of claim 8, further comprising program code to perform the vehicle control action to maneuver the ego vehicle according to the predicted motion of the detected pedestrian agents within the traffic environment of the ego vehicle.

13. The non-transitory computer-readable medium of claim 8, in which the vehicle control action comprises throttling, steering, and/or braking.

14. The non-transitory computer-readable medium of claim 8, in which the program code to update the parameters comprises program code to train the trained, control-aware prediction objective model to weight a log likelihood of a trajectory of each of the pedestrian agents in the scene by a respective contribution of the pedestrian agents to a control decision of the ego vehicle.

15. A system for generating an output trajectory of an ego vehicle, the system comprising:

a vehicle perception module to record trajectory data of the ego vehicle and pedestrian agents from a scene of a training environment of the ego vehicle;

a control-aware prediction objective model to select an nth pedestrian agent in the scene, to enumerate each of the pedestrian agents in the scene other than the nth pedestrian agent, to compute control outputs from a controller of the pedestrian agents according to the recorded trajectory data, to resample a different trajectory from a known trajectory of the nth agent, $\hat{y}_n^k \sim q_\theta(\hat{y}_n|x)$, to compute a control output from the ego vehicle controller according to the different trajectory $\hat{u}_n^k = \pi(\{\hat{y}_n^k\} \cup y\backslash\{y_n\})$, and to compare the control output against control outputs of the pedestrian agents according to the recorded trajectory data $u=\pi(y)$ to identify at least one pedestrian agent causing a prediction-discrepancy by the ego vehicle greater than the pedestrian agents within the scene;

a model parameter update module to update parameters of a motion prediction model of the ego vehicle based on a magnitude of the prediction-discrepancy caused by the at least one pedestrian agent on the ego vehicle to form a trained, control-aware prediction objective model; and a vehicle action selection module to select a vehicle control action of the ego vehicle in response to a predicted motion from the trained, control-aware prediction objective model regarding detected pedestrian agents within a traffic environment of the ego vehicle.

16. The system of claim 15, in which the vehicle action selection module is further to perform the vehicle control action to maneuver the ego vehicle according to the predicted motion of the detected pedestrian agents within the traffic environment of the ego vehicle.

17. The system of claim 15, in which the vehicle control action comprises throttling, steering, and/or braking.

18. The system of claim 15, in which the model parameter update module is further to train the trained, control-aware prediction objective model to weight a log likelihood of a trajectory of each of the pedestrian agents in the scene by a respective contribution of the pedestrian agents to a control decision of the ego vehicle.

* * * * *